(12) United States Patent
Strebe et al.

(10) Patent No.: US 12,181,320 B2
(45) Date of Patent: Dec. 31, 2024

(54) FLOW CONTROL ASSEMBLY WITH USER INTERFACE FEATURES

(71) Applicant: Johnson Controls Technology Company, Auburn Hills, MI (US)

(72) Inventors: Cory C. Strebe, Wauwatosa, WI (US); Frank J. Stier, Studio City, CA (US); Kyle M. Bero, Milwaukee, WI (US); George J. Dietz, Delafield, WI (US)

(73) Assignee: Johnson Controls Technology Company, Auburn Hills, MI (US)

( * ) Notice: Subject to any disclaimer, the term of this patent is extended or adjusted under 35 U.S.C. 154(b) by 144 days.

(21) Appl. No.: 16/849,748

(22) Filed: Apr. 15, 2020

(65) Prior Publication Data
US 2021/0325228 A1 Oct. 21, 2021

(51) Int. Cl.
| | |
|---|---|
| *G01F 15/063* | (2022.01) |
| *G01F 1/66* | (2022.01) |
| *G01F 15/00* | (2006.01) |
| *G05D 7/06* | (2006.01) |
| *G05D 23/19* | (2006.01) |

(52) U.S. Cl.
CPC ......... *G01F 15/063* (2013.01); *G05D 7/0623* (2013.01); *G05D 7/0635* (2013.01); *G05D 23/1931* (2013.01); *G01F 1/66* (2013.01); *G01F 15/001* (2013.01); *G01F 15/005* (2013.01)

(58) Field of Classification Search
CPC .... G01F 15/063; G01F 15/001; G01F 15/005; G01F 1/66; G05D 7/0623; G05D 7/0635; G05D 23/1931

USPC .................................................... 73/861, 195
See application file for complete search history.

(56) References Cited

U.S. PATENT DOCUMENTS

| | | | | |
|---|---|---|---|---|
| 5,214,587 | A * | 5/1993 | Green | G01D 4/008 705/412 |
| 5,782,296 | A * | 7/1998 | Mehta | G04G 15/006 236/46 R |
| 7,744,008 | B2 * | 6/2010 | Chapman, Jr. et al. | F24H 9/2007 62/157 |
| 7,801,646 | B2 * | 9/2010 | Amundson | F24F 11/30 700/83 |
| 8,554,374 | B2 * | 10/2013 | Lunacek | F24F 11/30 236/94 |
| 8,620,841 | B1 * | 12/2013 | Filson | G06N 5/02 706/12 |
| 8,706,270 | B2 * | 4/2014 | Fadell | F24F 11/0012 700/83 |
| 9,085,882 | B2 * | 7/2015 | Hanna | E03C 1/05 |
| 9,400,192 | B1 * | 7/2016 | Salser, Jr. | G01F 15/18 |
| 9,489,062 | B2 * | 11/2016 | Corcoran | G06F 3/04847 |

(Continued)

*Primary Examiner* — William M Mccalister
(74) *Attorney, Agent, or Firm* — Foley & Lardner LLP

(57) ABSTRACT

A flow meter control assembly including a housing. The flow meter control assembly further includes a user interface disposed in the housing. The user interface includes an input device configured to receive a configuration parameter from a user and a display configured to display the configuration parameter. The flow meter control assembly further includes a processing circuit disposed within the housing and coupled to the user interface, the processing circuit configured to update a control program of at least one of the flow meter control assembly and an actuator coupled to the flow meter control assembly based on the configuration parameter.

20 Claims, 15 Drawing Sheets

(56) References Cited

U.S. PATENT DOCUMENTS

| | | | |
|---|---|---|---|
| 9,568,204 B2* | 2/2017 | Asmus | G01D 3/08 |
| 9,777,470 B2* | 10/2017 | Mazz | E03C 1/055 |
| 9,804,610 B2* | 10/2017 | Sloo | G06F 3/0482 |
| 11,041,839 B2* | 6/2021 | Gifford | G05D 7/0617 |
| 11,045,828 B2* | 6/2021 | Floyd | G06N 3/08 |
| 11,255,076 B2* | 2/2022 | Floyd | A47K 3/286 |
| 11,255,835 B2* | 2/2022 | Clark | F17D 5/00 |
| D945,975 S * | 3/2022 | Abramson | D13/168 |
| 11,295,629 B1* | 4/2022 | Peets | E03C 1/055 |
| 2007/0152074 A1* | 7/2007 | Stowe | E03C 1/055 |
| | | | 236/12.1 |
| 2008/0150750 A1* | 6/2008 | Parris | G01D 11/245 |
| | | | 73/201 |
| 2009/0165866 A1* | 7/2009 | Fima | F16K 5/0605 |
| | | | 137/551 |
| 2011/0186154 A1* | 8/2011 | Klicpera | G01F 15/063 |
| | | | 137/551 |
| 2012/0290268 A1* | 11/2012 | Bey | G01F 1/6845 |
| | | | 702/189 |
| 2016/0041019 A1* | 2/2016 | Hannon | G01F 15/075 |
| | | | 702/45 |
| 2016/0258144 A1* | 9/2016 | Tayenaka | G05D 27/02 |
| 2016/0378322 A1* | 12/2016 | Klicpera | G06F 3/0362 |
| | | | 715/773 |
| 2017/0160119 A1* | 6/2017 | Outlaw | G01F 15/063 |
| 2017/0184417 A1* | 6/2017 | Pedreiro | G01D 4/002 |
| 2017/0295058 A1* | 10/2017 | Gottschalk | H04L 41/0803 |
| 2017/0350102 A1* | 12/2017 | Lee | G05D 23/1393 |
| 2017/0364103 A1* | 12/2017 | Herrera | F16K 31/04 |
| 2018/0094413 A1* | 4/2018 | Chaky | E03C 1/055 |
| 2018/0298596 A1* | 10/2018 | Tsai | E03C 1/0408 |
| 2019/0024350 A1* | 1/2019 | Silverstein | G01S 13/88 |

* cited by examiner

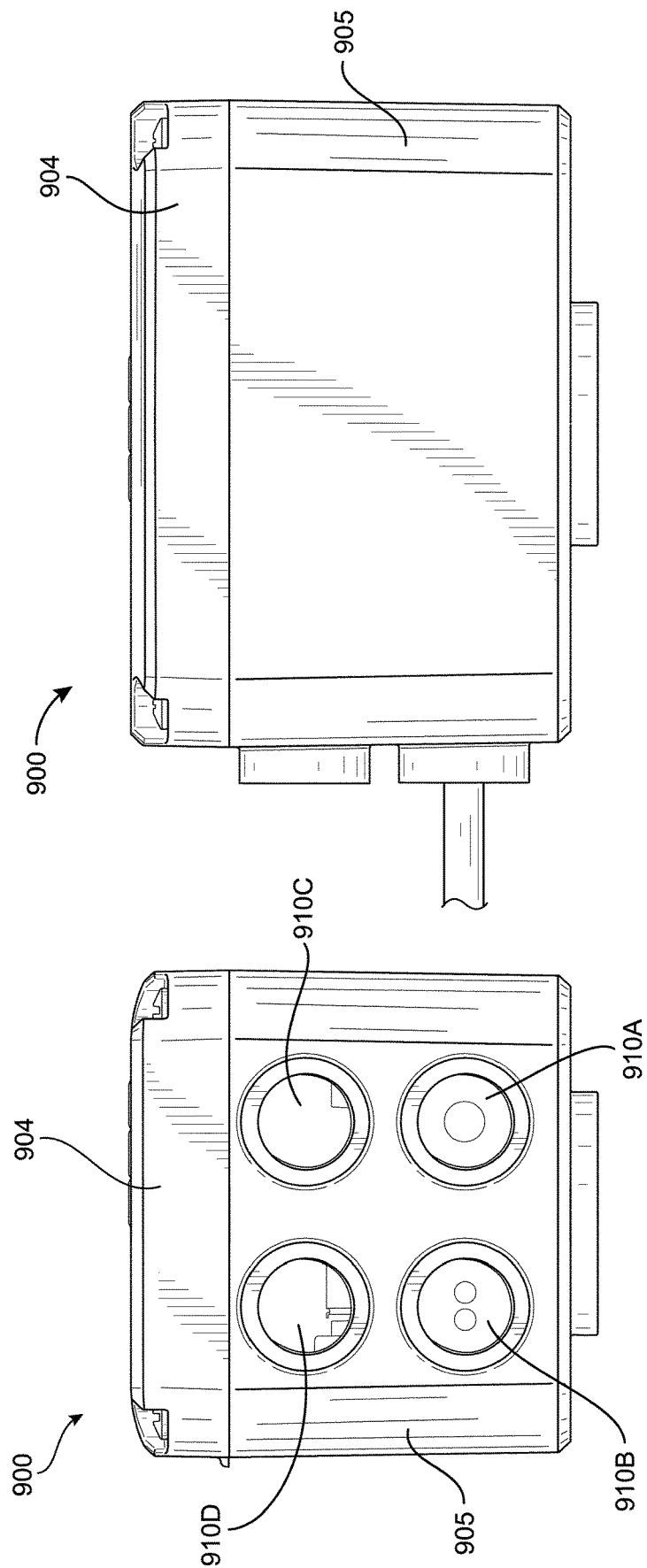

FLOW CONTROL ASSEMBLY WITH USER INTERFACE FEATURES

BACKGROUND

Flow control assemblies and associated components (e.g., flow sensors or meters, valves, actuators, etc.) may be used to control, monitor, and manage equipment in or around a building or building area, including a heating, ventilation, or air conditioning (HVAC) system, a waterside system, a security system, a lighting system, a fire alerting system, any other system that is capable of managing building functions or devices, or any combination thereof.

SUMMARY

Some embodiments relate to a flow meter control assembly. The flow meter control assembly includes a housing. The flow meter control assembly further includes a user interface disposed in the housing. The user interface includes an input device configured to receive a configuration parameter from a user and a display configured to display the configuration parameter. The flow meter control assembly further includes a processing circuit disposed within the housing and coupled to the user interface, the processing circuit configured to update a control program of at least one of the flow meter control assembly and an actuator coupled to the flow meter control assembly based on the configuration parameter.

In some embodiments, the configuration parameter comprises a configuration parameter for the actuator. In various embodiments, the configuration parameter comprises at least one of a position setpoint, a speed setpoint, an end stop location, and a stroke length. In some embodiments the configuration parameter comprises a configuration parameter for the flow meter control assembly. In various embodiments the input device comprises a plurality of input buttons. In some embodiments the user interface comprises a touchscreen. In various embodiments the user interface is configured to be detachably coupled to the housing such that the user interface is operational both when mounted in the housing and when detached from the housing. In some embodiments the user interface further comprises a plurality of status indicators configured to illuminate at least one of a plurality of colors and a plurality of light patterns to indicate a status of the actuator. In various embodiments the processing circuit is configured to receive data from a flow sensor and display at least one of a flow rate and an energy performance.

Some embodiments relate to a flow sensor assembly. The flow sensor assembly includes a flow sensor. The flow sensor assembly further includes a flow meter coupled to the flow sensor. The flow meter includes a housing. The flow meter further includes a user interface disposed in the housing and configured to receive a plurality of parameter values for a plurality of flow sensor assembly operating parameters and a processing circuit disposed in the housing and communicably coupled to the user interface and the flow sensor. The processing circuit is configured to receive sensor data from the flow sensor. The processing circuit is further configured to receive a user input from the user interface and modify an operating condition of the flow sensor assembly based at least in part on the user input.

In some embodiments, the user interface comprises a plurality of input buttons. In some embodiments, the user interface comprises a touchscreen. In some embodiments, the user interface is configured to be detachably coupled to the housing such that the user interface is operational both when mounted in the housing and when detached from the housing. In some embodiments, the user interface further comprises a plurality of status indicators configured to illuminate at least one of a plurality of colors and a plurality of light patterns to indicate a status of an actuator. In some embodiments, the processing circuit is configured to display at least one of a flow rate and an energy performance based on the received sensor data. In some embodiments, the processing circuit is further configured to receive flow sensor data from the flow sensor and display at least one of an instantaneous flow rate and an energy performance based on the flow sensor data. In some embodiments, the processing circuit is further configured to update a control program of the flow sensor assembly based at least in part on the plurality of flow sensor assembly operating parameters.

Some embodiments relate to a method for operating an actuator using a flow meter control unit. The method includes receiving a configuration parameter from a user at a user interface of a flow control assembly. The method further includes displaying the configuration parameter via the user interface. The method further includes transmitting the configuration parameter to the actuator and updating a control program of the actuator based at least in part on the configuration parameter.

In some embodiments, the configuration parameter comprises at least one of a position setpoint, a speed setpoint, an end stop location, and a stroke length. In some embodiments, the method further includes receiving flow sensor data from a flow sensor and displaying at least one of an instantaneous flow rate and an energy performance based on the flow sensor data.

BRIEF DESCRIPTION OF THE DRAWINGS

FIG. 11 is a side elevation view of the flow meter control unit of FIG. 10, according to some embodiments.

FIG. 12 is another side elevation view of the flow meter control unit of FIG. 10, according to some embodiments.

DETAILED DESCRIPTION

Before turning to the FIGURES, which illustrate the exemplary embodiments in detail, it should be understood that the disclosure is not limited to the details or methodology set forth in the description or illustrated in the figures. It should also be understood that the terminology is for the purpose of description only and should not be regarded as limiting.

Referring to the FIGURES generally, various embodiments disclosed herein relate to a control unit (e.g., flow meter control unit) equipped with user interface components to enable a user to configure and adjust configuration parameters of a system (e.g., BMS, HVAC). In some embodiments, various user interface components (e.g., display, status indicators) can provide feedback to the user such that the user can determine one or more operating conditions of the system. For example, the user can be provided, utilizing a display or indicator of the user interface components, energy performance of the system. In another example, the user can be provided, utilizing a display or indicator of the user interface components, an instantaneous flow rate of the system. In both examples, the user is provided feedback from the system such that the user can utilize that information to subsequently configure the configuration parameters (e.g., utilizing unit controls) of the system such that an operating condition of the system can be modified.

Building Management System and HVAC System

Figure 1:
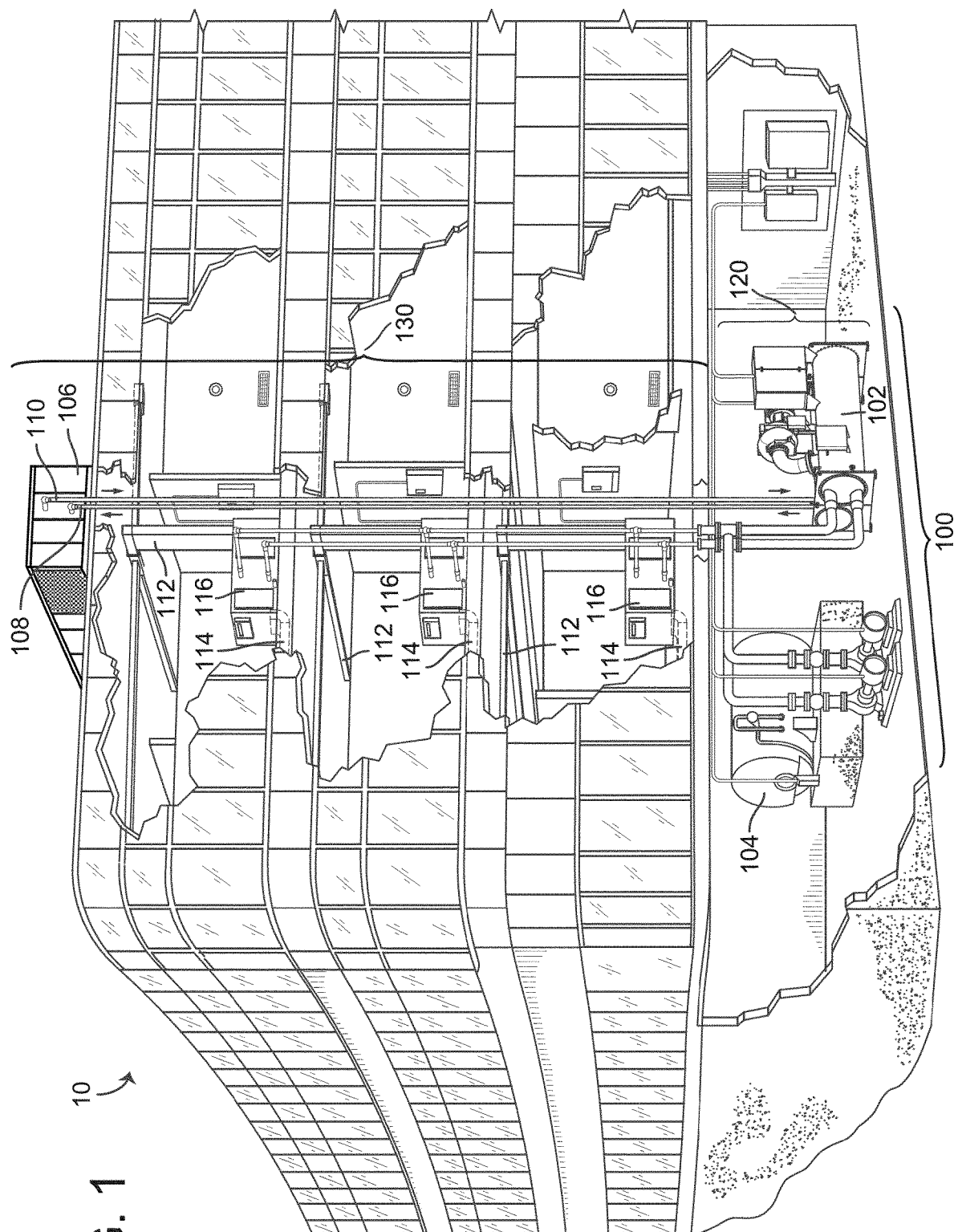
FIG. 1 is a drawing of a building equipped with a heating, ventilating, or air conditioning (HVAC) system and a building management system (BMS), according to some embodiments.

Referring now to FIGS. 1-4, an exemplary building management system (BMS) and HVAC system in which the systems and methods of the present disclosure can be implemented are shown, according to some embodiments. Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes an HVAC system 100. HVAC system 100 may include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 may provide a heated or chilled fluid to an air handling unit of airside system 130. Airside system 130 may use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 may use boiler 104 and chiller 102 to heat or cool a working fluid (e.g., water, glycol, etc.) and may circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 may add heat to the circulated fluid, for example, by burning a combustible material (e.g., natural gas) or using an electric heating element. Chiller 102 may place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 may place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 may transfer heat between the airflow and the working fluid to provide heating or cooling for the airflow. For example, AHU 106 may include one or more fans or blowers configured to pass the airflow over or through a heat exchanger containing the working fluid. The working fluid may then return to chiller 102 or boiler 104 via piping 110.

Airside system 130 may deliver the airflow supplied by AHU 106 (i.e., the supply airflow) to building 10 via air supply ducts 112 and may provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 may include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 may include various sensors (e.g., temperature sensors, pressure sensors, etc.) configured to measure attributes of the supply airflow. AHU 106 may receive input from sensors located within AHU 106 and/or within the building zone and may adjust the flow rate, temperature, or other attributes of the supply airflow through AHU 106 to achieve setpoint conditions for the building zone.

Figure 2:
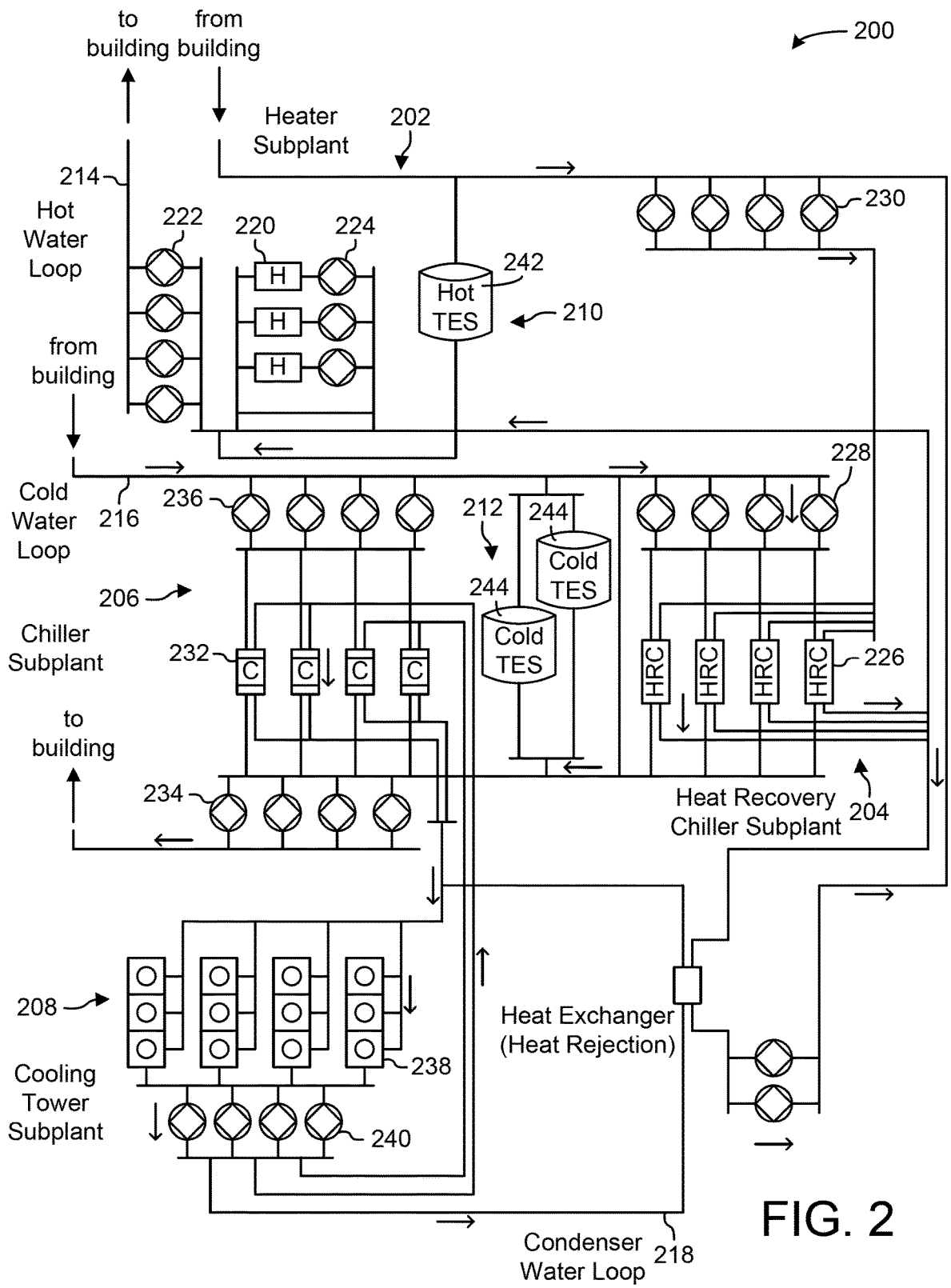
FIG. 2 is a schematic diagram of a waterside system that can be used to support the HVAC system of FIG. 1, according to some embodiments.

Referring now to FIG. 2, a block diagram of a waterside system 200 is shown, according to some embodiments. In various embodiments, waterside system 200 may supplement or replace waterside system 120 in HVAC system 100 or can be implemented separate from HVAC system 100. When implemented in HVAC system 100, waterside system 200 may include a subset of the HVAC devices in HVAC system 100 (e.g., boiler 104, chiller 102, pumps, valves, etc.) and may operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 may absorb heat from the cold water in chiller subplant 206 and reject the absorbed heat in cooling tower subplant 208 or transfer the absorbed heat to hot water loop 214. Hot TES subplant 210 and cold TES subplant 212 may store hot and cold thermal energy, respectively, for subsequent use.

Hot water loop 214 and cold water loop 216 may deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) can be used in place of or in addition to water to serve the thermal energy loads. In other embodiments, subplants 202-212 may provide heating and/or cooling directly to the building or campus without requiring an intermediate heat transfer fluid. These and other variations to waterside system 200 are within the teachings of the present disclosure.

Each of subplants 202-212 may include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 may also include one or more pumps or valves configured to control the flow rate of the hot water into or out of hot TES tank 242. Cold TES subplant 212 is shown to include cold TES tanks 244 configured to store the cold water for later use. Cold TES subplant 212 may also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 may include more, fewer, or different types of devices and/or subplants based on the particular configuration of waterside system 200 and the types of loads served by waterside system 200.

Figure 3:
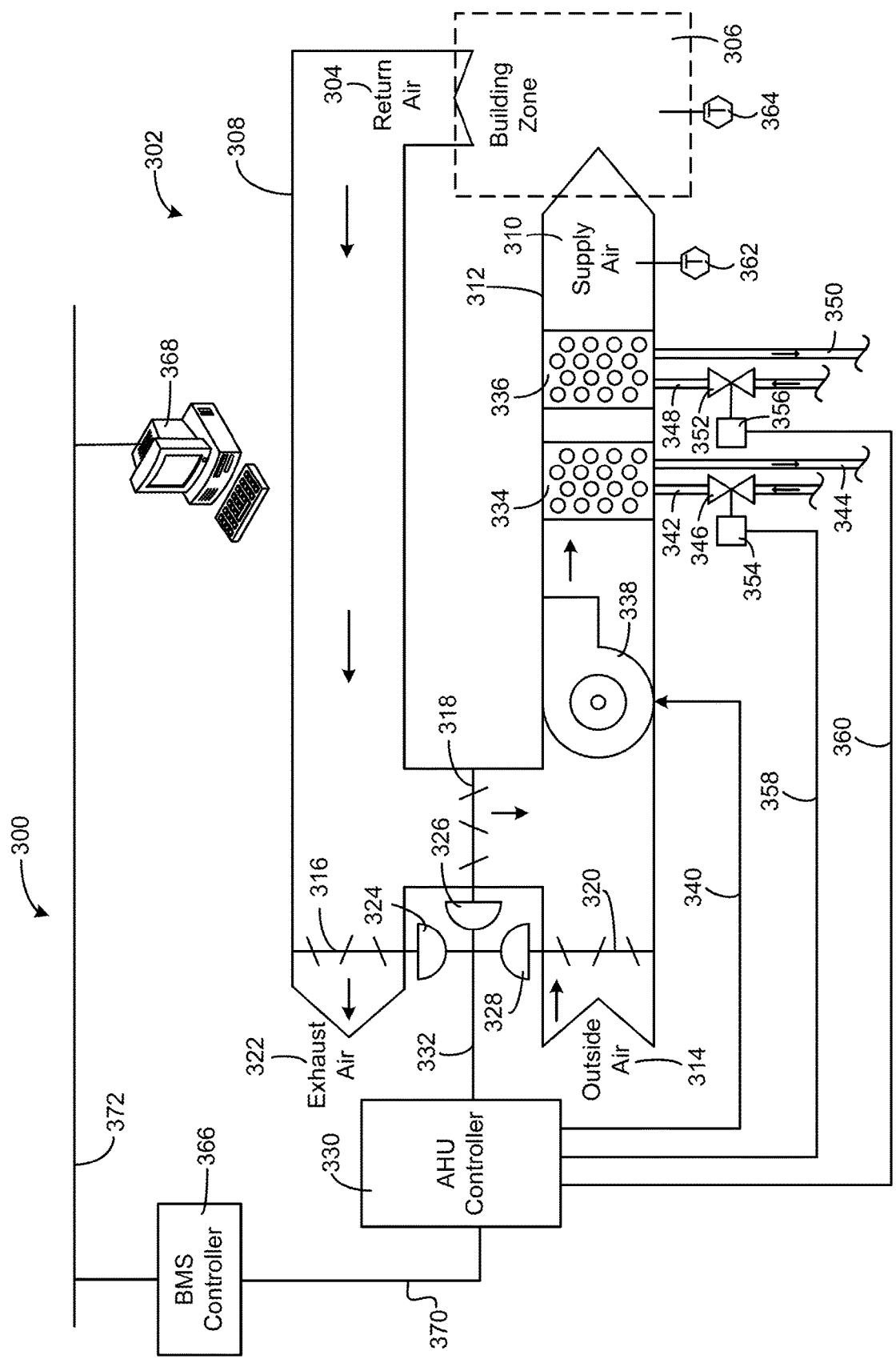
FIG. 3 is a block diagram of an airside system that can be used as part of the HVAC system of FIG. 1, according to some embodiments.

Referring now to FIG. 3, a block diagram of an airside system 300 is shown, according to some embodiments. In various embodiments, airside system 300 may supplement or replace airside system 130 in HVAC system 100 or can be implemented separate from HVAC system 100. When implemented in HVAC system 100, airside system 300 may include a subset of the HVAC devices in HVAC system 100 (e.g., AHU 106, VAV units 116, ducts 112-114, fans, dampers, etc.) and can be located in or around building 10. Airside system 300 may operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 may receive return air 304 from building zone 306 via return air duct 308 and may deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 may communicate with an AHU controller 330 via a communications link 332. Actuators 324-328 may receive control signals from AHU controller 330 and may provide feedback signals to AHU controller 330. Feedback signals may include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 may communicate with fan 338 via communications link 340 to control a flow rate of supply air 310. In some embodiments, AHU controller 330 controls an amount of heating or cooling applied to supply air 310 by modulating a speed of fan 338.

Cooling coil 334 may receive a chilled fluid from waterside system 200 (e.g., from cold water loop 216) via piping 342 and may return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 may receive a heated fluid from waterside system 200 (e.g., from hot water loop 214) via piping 348 and may return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 may communicate with AHU controller 330 via communications links 358-360. Actuators 354-356 may receive control signals from AHU controller 330 and may provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 may also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a setpoint temperature for supply air 310 or to maintain the temperature of supply air 310 within a setpoint temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 may control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 may include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 may communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 may provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 may include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 may communicate with BMS controller 366 and/or AHU controller 330 via communications link 372.

Figure 4:
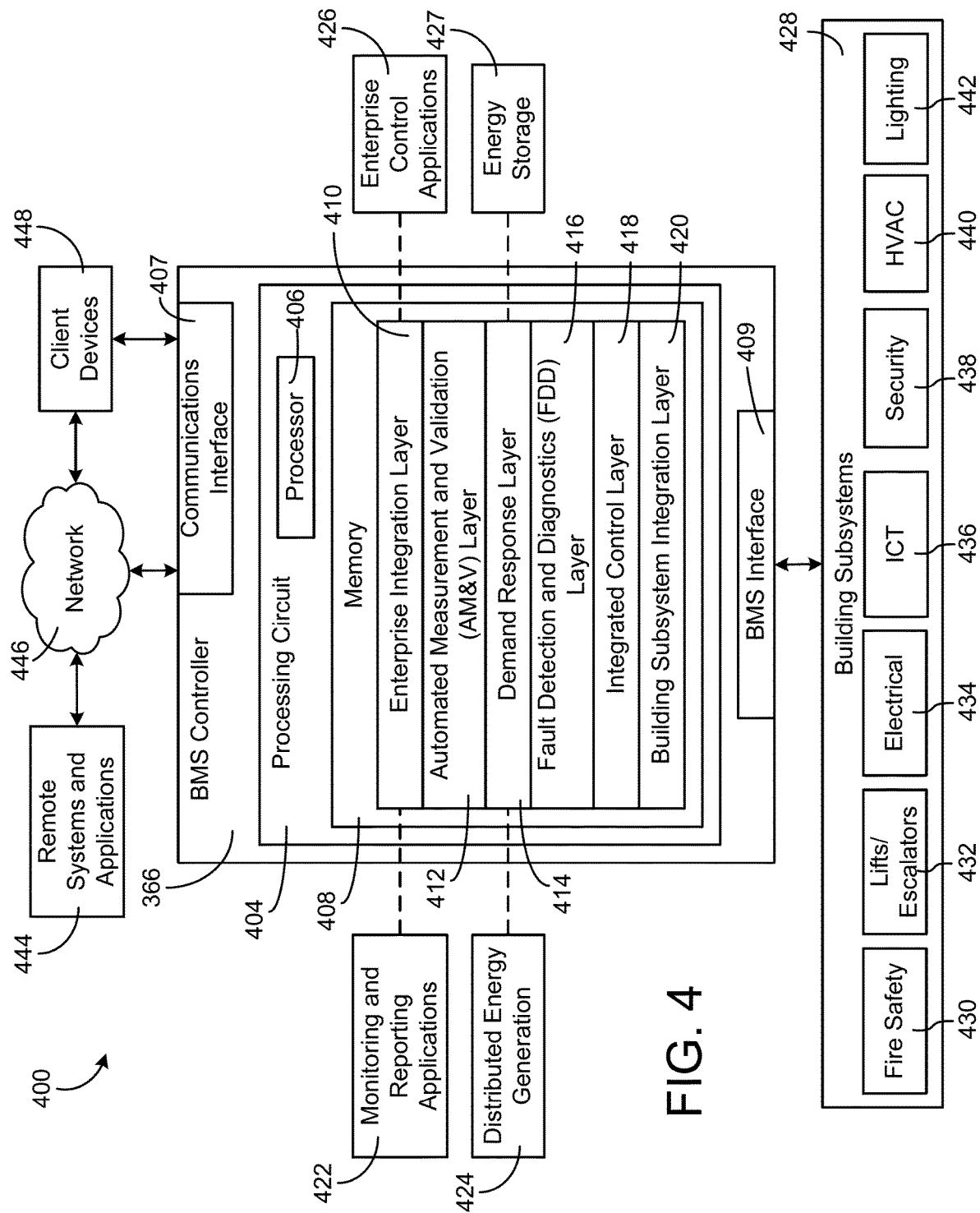
FIG. 4 is a block diagram of a BMS that can be implemented in the building of FIG. 1, according to some embodiments.

Referring now to FIG. 4, a block diagram of a building management system (BMS) 400 is shown, according to some embodiments. BMS 400 can be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 may include any number of devices, controllers, and connections for completing its individual functions and control activities. HVAC subsystem 440 may include many of the same components as HVAC system 100, as described with reference to FIGS. 1-3. For example, HVAC subsystem 440 may include and number of chillers, heaters, handling units, economizers, field controllers, supervisory controllers, actuators, temperature sensors, and/or other devices for controlling the temperature, humidity, airflow, or other variable conditions within building 10. Lighting subsystem 442 may include any number of light fixtures, ballasts, lighting sensors, dimmers, or other devices configured to controllably adjust the amount of light provided to a building space. Security subsystem 438 may include occupancy sensors, video surveillance cameras, digital video recorders, video processing servers, intrusion detection devices, access control devices and servers, or other security-related devices.

Still referring to FIG. 4, BMS controller 366 is shown to include a communications interface 407 and a BMS interface 409. Interface 407 may facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 may also facilitate communications between BMS controller 366 and client devices 448. BMS interface 409 may facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a WiFi transceiver for communicating via a wireless communications network. In another example, one or both of interfaces 407, 409 may include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 may include database components, object code components, script components, or any other type of information structure for supporting the various activities and information structures described in the present application. According to some embodiments, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 may also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be configured to manage communications between BMS controller 366 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 may receive inputs from other layers of BMS controller 366 (e.g., building subsystem integration layer 420, integrated control layer 418, etc.). The inputs received from other layers may include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to some embodiments, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models may include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, XML, files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable setpoint adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In some embodiments, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may reduce disruptive demand response behavior relative to conventional systems. For example, integrated control layer 418 can be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 may compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults may include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to some embodiments, FDD layer 416 (or a policy executed by an integrated control engine or business rules engine) may shut-down systems or direct control activities around faulty devices or systems to reduce energy waste, extend equipment life, or assure proper control response.

FDD layer 416 can be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 400 and the various components thereof. The data generated by building subsystems 428 may include measured or calculated values that exhibit statistical characteristics and provide information about how the corresponding system or process (e.g., a temperature control process, a flow control process, etc.) is performing in terms of error from its setpoint. These processes can be examined by FDD layer 416 to expose when the system begins to degrade in performance and alert a user to repair the fault before it becomes more severe.

Valve Assembly

Figure 5:
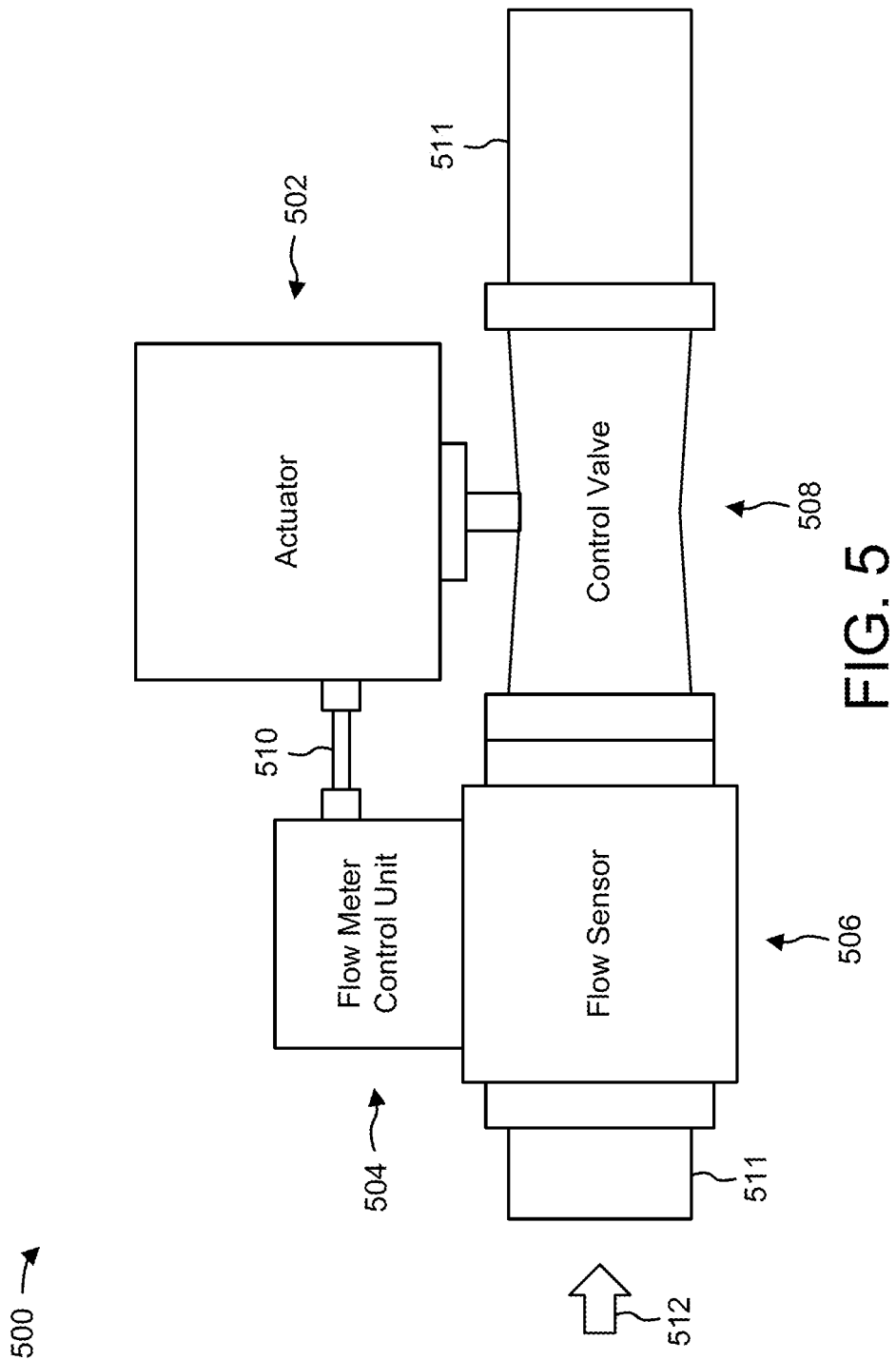
FIG. 5 is a schematic diagram of an electronic pressure-independent control valve assembly that can be implemented in the HVAC system of FIG. 1, according to some embodiments.

Referring now to FIG. 5, a block diagram of an electronic pressure-independent control valve assembly 500 is shown, according to some embodiments. Valve assembly 500 can be used in HVAC system 100, waterside system 200, airside system 300, or BMS 400, as described with reference to FIGS. 1-4. Valve assembly 500 is shown to include an actuator 502 coupled to a valve 508. For example, actuator 502 can be a damper actuator, a valve actuator, a fan actuator, a pump actuator, or any other type of actuator that can be used in an HVAC system or BMS. In various embodiments, actuator 502 can be a linear actuator (e.g., a linear proportional actuator), a non-linear actuator, a spring return actuator, or a non-spring return actuator, a rotary actuator (e.g., fail safe actuator, or fail in place actuator).

Valve 508 can be any type of control device configured to control an environmental parameter in an HVAC system, including a 2-way or 3-way two position electric motorized valve, a ball isolation valve, a floating point control valve, an adjustable flow control device, or a modulating control valve. In some embodiments, valve 508 may regulate a flow 512 of fluid through a conduit, pipe, tubular member, or tube (e.g., conduit 511) in a waterside system (e.g., waterside system 200, shown in FIG. 2). Conduit 511 may include upstream conduit sections and downstream conduit sections.

In some embodiments, actuator 502 and valve 508 can be packaged together. In short, actuator 502 and valve 508 may not be packaged as separate devices, but as a single device. Reducing the number of devices in an HVAC system may provide numerous advantages, most notably in time and cost savings during the installation process. Because it is not necessary to install actuator 502 and valve 508 as separate devices and then make a connection between them, technicians performing the installation may require less specialized training and fewer tools. Other advantages of a single device may include simplification of control and troubleshooting functions. However, in some embodiments, actuator 502 and valve 508 are packaged as separate devices that can be coupled on-site.

Still referring to FIG. 5, a flow sensor assembly 506 is shown according to one embodiment. Conduit 511 may be installed between the flow sensor assembly 506 and the valve 508 to ensure proper functioning of the flow sensor assembly 506. Flow sensor assembly 506 can be configured to measure a flow rate or a velocity of fluid passing through conduit 511 and/or valve 508. Flow sensor assembly 506 can be any type of device (e.g., ultrasonic detector) configured to measure the flow rate or velocity using any applicable flow sensing method.

Still referring to FIG. 5, flow sensor assembly 506 may be fixedly coupled with a flow meter control unit 504 (e.g., sensor controller. Flow meter control unit 504 can be communicably coupled via a wired (e.g., wire 510) or a wireless connection to actuator 502 and a measured volumetric flow and/or a velocity data from flow sensor assembly 506 can be provided to actuator device 502. Flow meter control unit 504 can be implemented as a general purpose processor, an application specific integrated circuit (ASIC), one or more field programmable gate arrays (FPGAs), a group of processing components, or other suitable electronic processing components. Flow meter control unit 504 can include a plurality of interfaces, as described in detail with reference to FIG. 7. In some embodiments, the flow meter control unit 504 can be communicably coupled via a wired or wireless connection to a client device (e.g., client device 448 shown in FIG. 4). In some embodiments, flow sensor assembly 506 and flow meter control unit 504 are located within a common integrated device chassis or housing. In short, flow sensor assembly 506 and flow meter control unit 504 may not be packaged as separate devices, but as a single device. However, in some embodiments, flow sensor assembly 506 and flow meter control unit 504 are packaged as separate devices that can be communicably coupled via a wired connection, wireless connection, or other connection.

Figure 6:
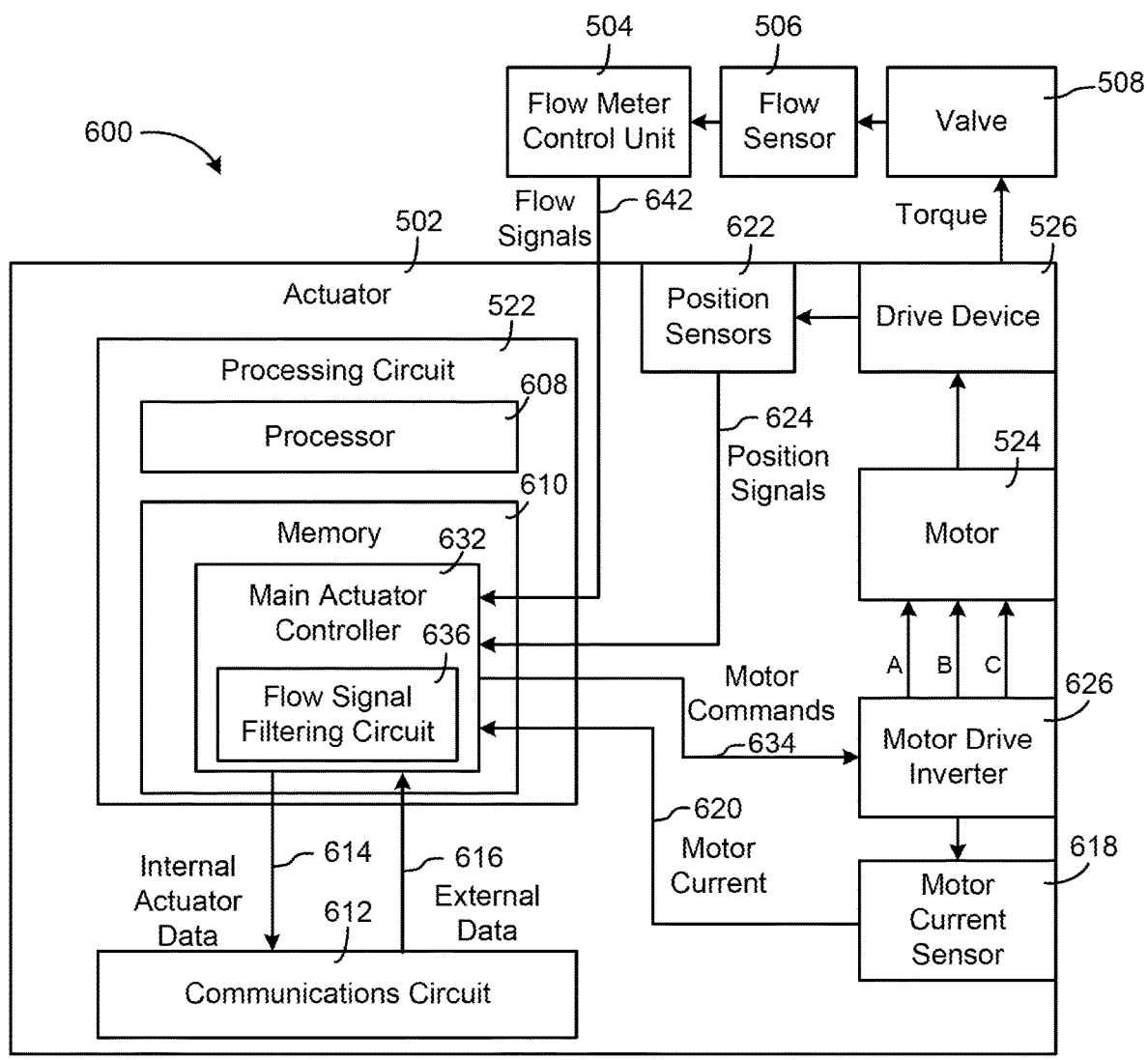
FIG. 6 is a block diagram of another electronic pressure-independent control valve assembly that can be implemented in the HVAC system of FIG. 1, according to some embodiments.

Turning now to FIG. 6, a block diagram of another electronic pressure-independent control valve assembly 600 is shown, according to some embodiments. Valve assembly 600 can be used in HVAC system 100, waterside system 200, airside system 300, or BMS 400, as described with reference to FIGS. 1-4. Valve assembly 600 may represent a more detailed version of valve assembly 500. For example, valve assembly 600 is shown to include actuator 502, which can be identical or substantially similar to actuator 502 in valve assembly 500. Actuator 502 can be configured to operate equipment 508. Equipment 508 may include any type of system or device that can be operated by an actuator (e.g., a valve, a damper). In an exemplary embodiment, actuator 502 and equipment 508 (e.g., a valve) are packaged within a common integrated device chassis.

Actuator 502 is shown to include a processing circuit 522 communicably coupled with a motor 524 (e.g., a rotary motor, a mechanical transducer, etc., or any other device configured to convert electrical energy to mechanical work). In some embodiments, motor 524 is a brushless DC (BLDC) motor. Processing circuit 522 is shown to include a processor 608, memory 610, and a main actuator controller 632. Processor 608 can be a general purpose or specific purpose processor, an application specific integrated circuit (ASIC), one or more field programmable gate arrays (FPGAs), a group of processing components, or other suitable processing components. Processor 608 can be configured to execute computer code or instructions stored in memory 610 or received from other computer readable media (e.g., CDROM, network storage, a remote server, etc.).

Memory 610 may include one or more devices (e.g., memory units, memory devices, storage devices, etc.) for storing data and/or computer code for completing and/or facilitating the various processes described in the present disclosure. Memory 610 may include random access memory (RAM), read-only memory (ROM), hard drive storage, temporary storage, non-volatile memory, flash memory, optical memory, or any other suitable memory for storing software objects and/or computer instructions. Memory 610 may include database components, object code components, script components, or any other type of information structure for supporting the various activities and information structures described in the present disclosure. Memory 610 can be communicably connected to processor 608 via processing circuit 522 and may include computer code for executing (e.g., by processor 608) one or more processes described herein. When processor 608 executes instructions stored in memory 610, processor 608 generally configures actuator 502 (and more particularly processing circuit 522) to complete such activities.

Main actuator controller 632 may be configured to receive external control data 616 (e.g., position setpoints, speed setpoints, etc.) from communications circuit 612, position signals 624 from position sensors 622, and flow signals 642 from flow meter control unit 504 based on one or more flow sensors 506. Main actuator controller 632 may be configured to determine the position of motor 524 and/or drive device 526 based on position signals 624. In some embodiments, main actuator controller 632 receives data from additional sources. For example, motor current sensor 618 may be configured to measure the electric current provided to motor 524. Motor current sensor 618 may generate a feedback signal indicating the motor current 620 and may provide this signal to main actuator controller 632 within processing circuit 608.

System fluctuations (e.g., pressure fluctuations) may result in high variance in the flow signals 642 received from flow meter control unit 504 based on the flow sensors 506 and erratic control of the valve member position. Various techniques may therefore be utilized to minimize variance in ultrasonic measurements. Flow signal filtering circuit 636 can be configured to implement various statistical filtering techniques (e.g. low pass filtering, Kalman filtering, etc.). In some embodiments, Kalman filters may be implemented to estimate a joint probability distribution for a flow sensor measurement at each time step. In other embodiments, low pass filtering techniques may be utilized to remove high frequency noise. The cutoff frequency for the filter may be based on various valve characteristics (e.g., valve size, type of valve). Because higher flow velocities lead to noisier measurements, any physical valve characteristic that alters the flow velocity through the valve may be considered in choosing a cutoff frequency for the filter. Filters may be enabled or disabled when the flow rate through the valve is changing rapidly. In still further embodiments, sensor fusion techniques to combine measurements from multiple ultrasonic sensors may be utilized. Each of the mathematical techniques described above may be utilized in isolation or in combination with one or more other mathematical techniques.

Still referring to FIG. 6, processing circuit 608 may be configured to output a pulse width modulated (PWM) DC motor command 634 to control the speed of motor 524. Motor 524 may be configured to receive a three-phase PWM voltage output (e.g., phase A, phase B, phase C) from motor drive inverter 626. The duty cycle of the PWM voltage output may define the rotational speed of motor 524 and may be determined by processing circuit 522 (e.g., a microcontroller). Processing circuit 522 may increase the duty cycle of the PWM voltage output to increase the speed of motor 524 and may decrease the duty cycle of the PWM voltage output to decrease the speed of motor 524.

Motor 524 may be coupled to drive device 526. Drive device 526 may be a drive mechanism, a hub, or other device configured to drive or effectuate movement of a HVAC system component (e.g., valve 508). For example, drive device may be configured to receive a shaft of a damper, a valve, or any other movable HVAC system component in order to drive (e.g., rotate) the shaft. In some embodiments, actuator 502 includes a coupling device configured to aid in coupling drive device 526 to the movable HVAC system component. For example, the coupling device may facilitate attaching drive device 526 to a valve or damper shaft.

Position sensors 622 may include Hall effect sensors, potentiometers, optical sensors, or other types of sensors configured to measure the rotational position of the motor 524 and/or drive device 526. Position sensors 622 may provide position signals 624 to processing circuit 522. Main actuator controller 632 may use position signals 624 to determine whether to operate the motor 524. For example, main actuator controller 632 may compare the current position of drive device 526 with a position setpoint received via external data input 616 and may operate the motor 524 to achieve the position setpoint.

Actuator 502 is further shown to include a communications circuit 612. Communications circuit 612 may be a wired or wireless communications link and may use any of a variety of disparate communications protocols (e.g., BACnet, LON, WiFi, Bluetooth, NFC, TCP/IP, etc.). In some embodiments, communications circuit 612 is an integrated circuit, chip, or microcontroller unit (MCU) configured to bridge communications actuator 502 and external systems or devices. In some embodiments, communications circuit 612 is the Johnson Controls BACnet on a Chip (JBOC) product. For example, communications circuit 612 can be a pre-certified BACnet communication module capable of communicating on a building automation and controls network (BACnet) using a master/slave token passing (MSTP) protocol. Communications circuit 612 can be added to any existing product to enable BACnet communication with minimal software and hardware design effort. In other words, communications circuit 612 provides a BACnet interface for the pressure disturbance rejection valve assembly 600. Further details regarding the JBOC product are disclosed in U.S. patent application Ser. No. 15/207,431 filed Jul. 11, 2016, the entire disclosure of which is incorporated by reference herein.

Communications circuit 612 may also be configured to support data communications within actuator 502. In some embodiments, communications circuit 612 may receive internal actuator data 614 (i.e., configuration parameters) from main actuator controller 632. For example, internal actuator data 614 may include the sensed motor current 620, a measured or calculated motor torque, the actuator position or speed, end stop locations, stroke length, commissioning data, equipment model data, firmware versions, software versions, time series data, a cumulative number of stop/start commands, a total distance traveled, an amount of time required to open/close valve 508, or any other type of data used or stored internally within actuator 502. In some embodiments, communications circuit 612 may transmit external data 616 (i.e., configuration parameters) to main actuator controller 632. External data 616 may include, for example, position setpoints, speed setpoints, control signals, end stop locations, stroke length, commissioning data, equipment model data, actuator firmware, actuator software, or any other type of data which can be used by actuator 502 to operate the motor 524 and/or drive device 526. In some embodiments, communications circuit 612 may receive external data from another system and/or processing circuit. For example, a user may input data into a flow meter control unit 504, as described in detail with reference to FIG. 5, which can subsequently be sent to communications circuit 612 via a wired or wireless communications link.

In some embodiments, external data 616 is a DC voltage control signal. Actuator 502 can be a linear proportional actuator configured to control the position of drive device 526 according to the value of the DC voltage received. For example, a minimum input voltage (e.g., 0.0 VDC) may correspond to a minimum rotational position of drive device 526 (e.g., 0 degrees, −5 degrees, etc.), whereas a maximum input voltage (e.g., 10.0 VDC) may correspond to a maximum rotational position of drive device 526 (e.g., 90 degrees, 95 degrees, etc.). Input voltages between the minimum and maximum input voltages may cause actuator 502 to move drive device 526 into an intermediate position between the minimum rotational position and the maximum rotational position. In other embodiments, actuator 502 can be a non-linear actuator or may use different input voltage ranges or a different type of input control signal (e.g., AC voltage or current) to control the position and/or rotational speed of drive device 526.

In some embodiments, external data 616 is an AC voltage control signal. Communications circuit 612 may be configured to transmit an AC voltage signal having a standard power line voltage (e.g., 120 VAC or 230 VAC at 50/60 Hz). The frequency of the voltage signal can be modulated (e.g., by main actuator controller 632) to adjust the rotational position and/or speed of drive device 526. In some embodiments, actuator 502 uses the voltage signal to power various components of actuator 502. Actuator 502 may use the AC voltage signal received via communications circuit 612 as a control signal, a source of electric power, or both. In some embodiments, the voltage signal is received from a power supply line that provides actuator 502 with an AC voltage having a constant or substantially constant frequency (e.g., 120 VAC or 230 VAC at 50 Hz or 60 Hz). Communications circuit 612 may include one or more data connections (separate from the power supply line) through which actuator 502 receives control signals from a controller or another actuator (e.g., 0-10 VDC control signals).

Flow Sensor Assembly

Figure 7:
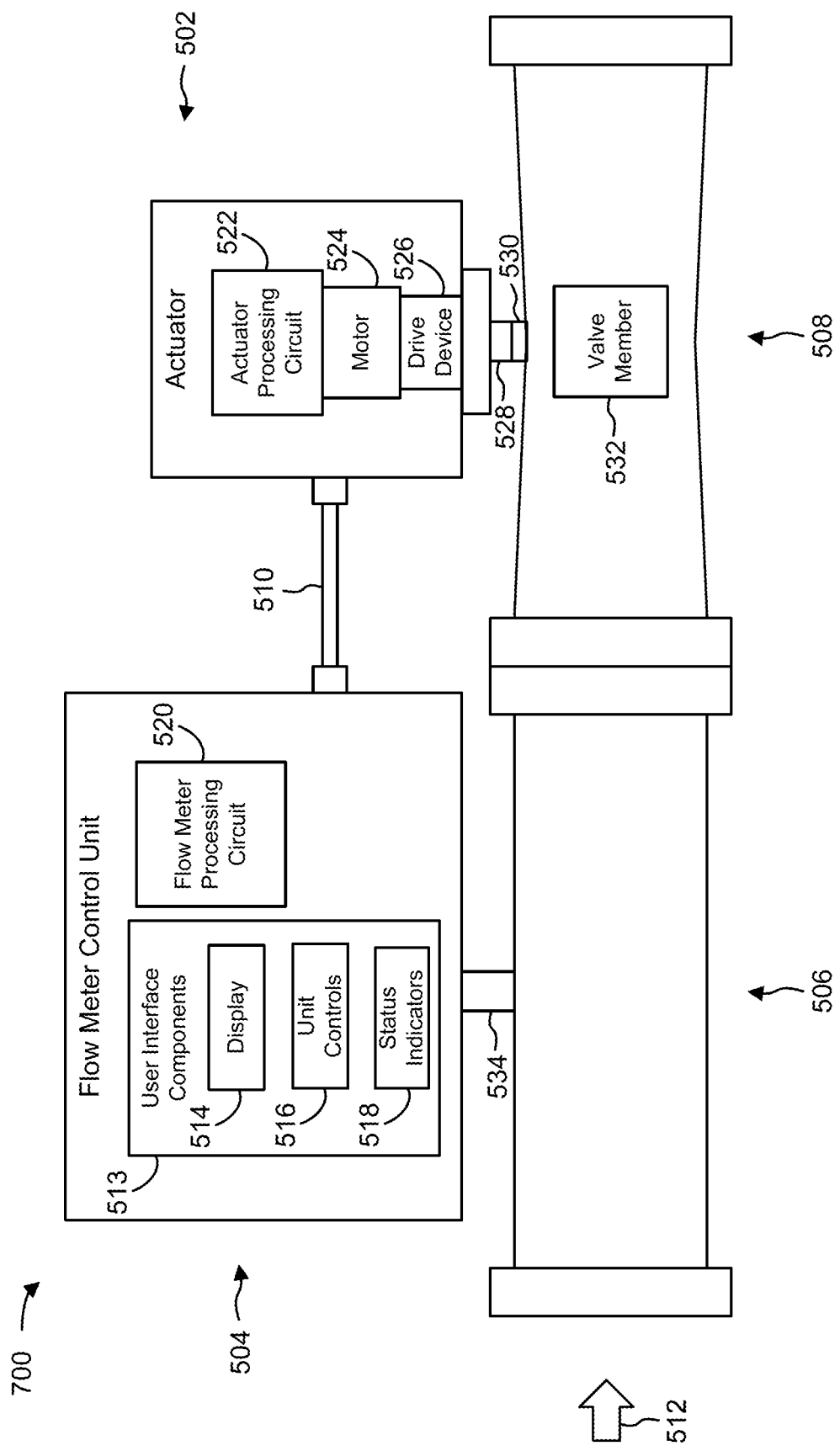
FIG. 7 is a schematic diagram of a flow sensor assembly that can be implemented in the HVAC system of FIG. 1, according to some embodiments.

Referring now to FIG. 7, a schematic diagram of a flow sensor assembly 700 is shown, according to some embodiments. Flow sensor assembly 700 is shown to include an actuator 502 coupled to a valve 508, a flow meter control unit 504 coupled to a flow sensor assembly 506, and the actuator 502 communicably coupled to the flow meter control unit 504. Actuator 502 may include a motor 524 coupled to a drive device 526. Drive device 526 is driven by motor 524 and configured to rotate a valve shaft 528 attached to a valve stem 530. Valve stem 530 consequently drives a valve member 532 to a position (i.e., actuator setpoint) resulting in regulation of a flow 512 of a fluid. Actuator 502 is also shown to include an actuator processing circuit 522 communicably coupled to motor 524 and a flow meter processing circuit 520 associated with the flow meter control unit 504. Actuator processing circuit 522 can be communicably coupled to the flow meter processing circuit 520 and the various components thereof can send and receive data (e.g. flow rate data, flow data, flow measurement data) via a wired or wireless network interface (e.g., communication line 510). In some embodiments, the actuator processing circuit 522 and flow meter processing circuit 520 may both use a variety of disparate communications protocols (e.g., BACnet, LON, WiFi, Bluetooth, NFC, TCP/IP, etc.).

In some embodiments, the flow meter processing circuit 520 may provide flow rate data to actuator processing circuit 522. For example, flow meter processing circuit 520 can provide filtered measurements (e.g. flow rate) to the actuator processing circuit 522 using statistical filtering techniques (e.g. low pass filtering, Kalman filtering, etc.). Various statistical filtering techniques can be utilized to minimize variance in data measurements, as described above with reference to FIG. 6. Calculated data (e.g., filtered flow measurements) in addition to received data (e.g., flow rate setpoints) can be used to determine actuator setpoints, as described with reference to FIG. 6.

For example, flow meter processing circuit 520 may be configured to receive sensor data from transducers (e.g., ultrasonic transducer) associated with the flow sensor assembly 506 and output measurements (e.g., of the flow rate) to the actuator processing circuit 522 using a Kalman filter. In some embodiments, flow meter processing circuit 520 is configured to use any of the filtering techniques described in greater detail with reference to U.S. application Ser. No. 13/756,229, filed Jan. 31, 2013, now U.S. Pat. No. 9,568,204, the entire disclosure of which is incorporated by reference herein. For example, flow meter processing circuit 520 can include a Kalman filter having a matrix Q (e.g., a process noise covariance matrix) that can be adaptively reset or adjusted. In some embodiments, flow meter processing circuit 520 is configured to perform process 500 shown in FIG. 5 of U.S. Pat. No. 9,568,204 using sensor data or flow measurements received from any of the sensors described herein to filter the sensor data or the flow measurements.

The flow meter control unit 504 can include a plurality of interfaces that can be communicably coupled with flow meter processing circuit 520. As shown, flow meter control unit 504 can include user interface components 513 that can include a display 514, unit controls 516, and status indicators 518. Display 514 may be a plurality of output devices utilized for presentation of information in a visual or tactile form (e.g., segment display, plasma display (PDP), liquid crystal display (LCD), light-emitting diode display (LED), quantum dot display (QLED)), while unit controls 518 may be communicably coupled to a plurality of input devices (e.g., touch screen controls, input buttons). Based on data received from the unit controls 516 the flow meter processing circuit 520 may execute processes (e.g., an application) and output data to the actuator processing circuit 522. The output data can be subsequently utilized to optimize and maintain the flow 512 of a fluid. In some embodiments, the output data can be displayed on the display 514 such that it can provide feedback to a user. Status indicators 518 may be communicably coupled to flow sensor assembly 506 such that it can receive real-time measurements of a flow rate or a velocity of a fluid. The flow meter processing circuit 520 may also be communicably coupled to status indicators 518 (e.g., light-emitting diodes (LEDs)) such that the status LEDs can indicate one or more statuses of flow sensor assembly 700, and as shown with reference to indicator lights 906 in FIGS. 9-18. For example, if a fault occurs in the flow sensor assembly 700, the flow meter processing circuit 520 can receive data indicating a fault occurred and subsequently send data to one or more of the status indicators 518 (i.e., LEDs) indicating a fault status (e.g., blinking red).

In some embodiments, user interface components 513 can include more component than are not shown. For example, user interface components 513 could include a geolocation indicator, where the geolocation indicator indicates the location of the flow sensor assembly 700 in a building. In another example, user interface components 513 could include a biometric sensor, where the biometric sensor (e.g., facial recognition, hand geometry, fingerprint, retina scanner, voice analysis) could receive user input to unlock the device such that the device must be unlocked before it can be utilized to configure the configuration parameters associated with the flow sensor assembly 700. In yet another example, user interface components 513 could include one or more sensors, where the sensors (e.g., temperature, gas, position) could provide input to the flow meter processing circuit 520.

In some embodiments, configuration parameters may be received from a user via the flow meter control unit 504 and communicated to the actuator 502 that can be utilized to configure the control valve 508 (e.g., to a different position). In various embodiments, the flow meter processing circuit 520 can be configured to execute an application that sends data (i.e., configuration parameters) to actuator 502 that can be utilized to operate the motor 524 and/or drive device 526. That is, the configuration parameters could be related to position setpoints, speed setpoints, control signals, end stop locations, stroke length, commissioning data, equipment model data, actuator firmware, actuator software, or any other type of data which can be used by actuator 502. In some embodiments, the data can be received via the user interface components 513 and associated with configuration parameters. For example, unit controls 518 may receive position setpoint data from a user. The unit controls 518 may communicate the position setpoint data to flow meter processing circuit 520, where the flow meter processing circuit 520 can communication the position setpoint data to the actuator 502 over communication line 510. In this particular example, the actuator processing circuit 522 can utilize the position setpoint data to ultimately drive the valve member 532 to a position associated with the position setpoint data.

Still referring to FIG. 7, flow sensor assembly 700 is further shown to include flow sensor assembly 506 directly coupled to valve 508. In general, flow sensor assembly 700 obtains flow measurements and provides the flow measurements to flow meter control unit 504 over a communication line 534. The flow sensor assembly 506 may include one or more, among other components, acoustic reflectors (mirrors), ultrasonic transducers, communication lines, and pipes. In some embodiments, communication line 534 (e.g. network interface) connecting flow sensor assembly 506 to flow meter control unit 504 can be wireless. In some embodiments, communication line 534 connecting flow sensor assembly 506 to flow meter control unit 504 can be wired.

Figure 8:
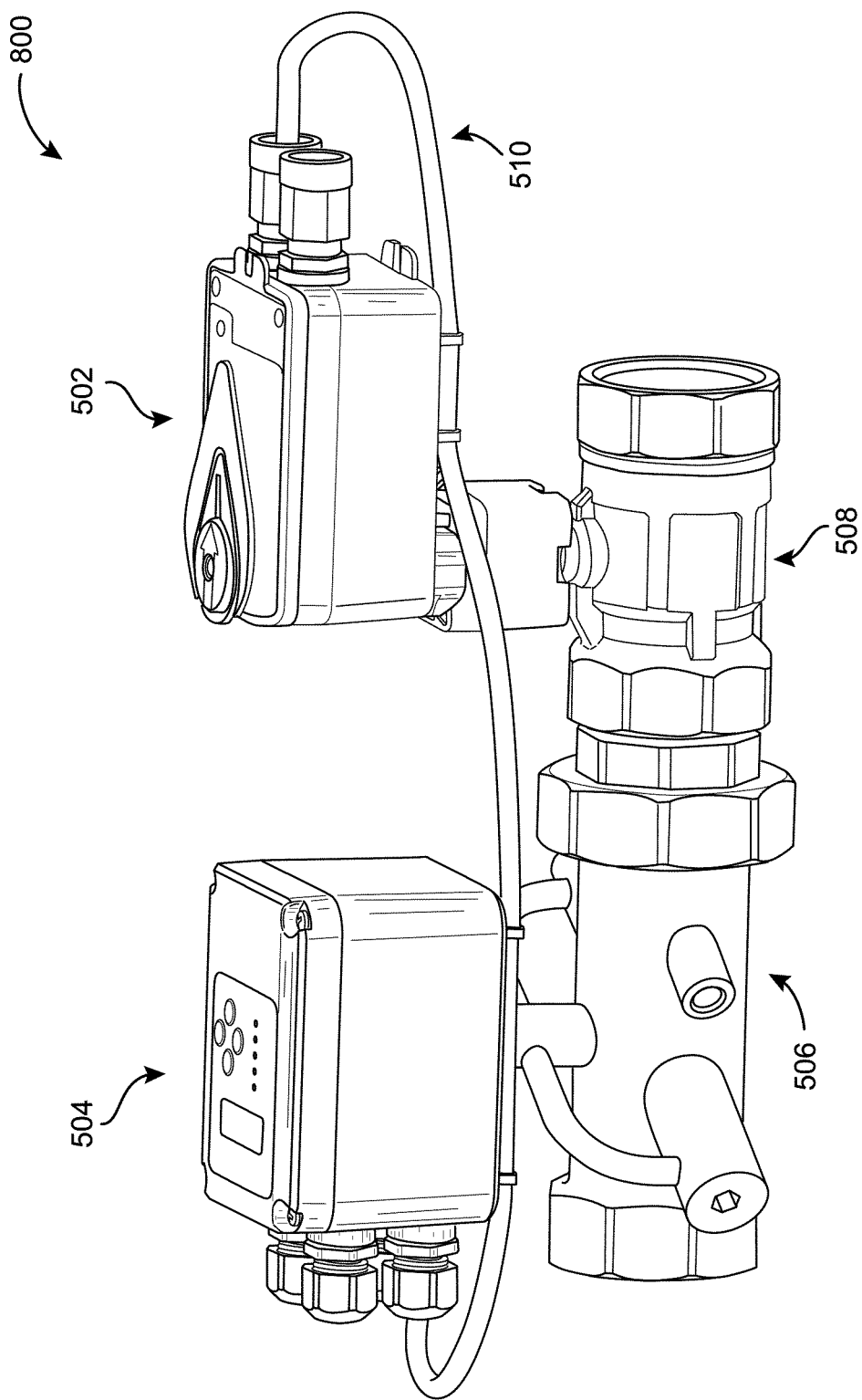
FIG. 8 is a perspective view of an electronic valve and actuator system, according to some embodiments.

FIG. 8 is a perspective view of an electronic valve and actuator system 800, according to some embodiments. The electronic valve and actuator system 800 can include an actuator 502, a flow meter control unit 504, a sensor assembly 506, and a valve 508. In some embodiments, electronic valve and actuator system 800 is a component or subsystem of HVAC system 100, waterside system 200, airside system 300, or BMS 400, as described with reference to FIGS. 1-4. In some implementations, each of actuator 502, flow meter control unit 504, sensor assembly 506, and valve 508 resemble similar features and functionality, described in detail with reference to FIGS. 5-7.

Flow Meter Control Unit

FIGS. 9-14 depict various views of the exterior of a flow meter control unit 900. Flow meter control unit 900 may be configured to control equipment (e.g., devices, controllers, sensors) associated with an HVAC system, a waterside system, an airside system, or a BMS, as described in detail with reference to FIGS. 1-4. As shown, flow meter control unit 900 may include, among other components, a user interface component 903 (e.g., display 514, unit control 516, and status indicators 518, as shown in FIG. 7), a first enclosure component 904, a second enclosure component 905, and communication lines 910. The user interface component 903 includes a display, unit controls, and status indicators which are described in further detail below with reference to FIG. 18, and resemble similar features and functionality, described in detail with reference to FIG. 7.

Figure 9:
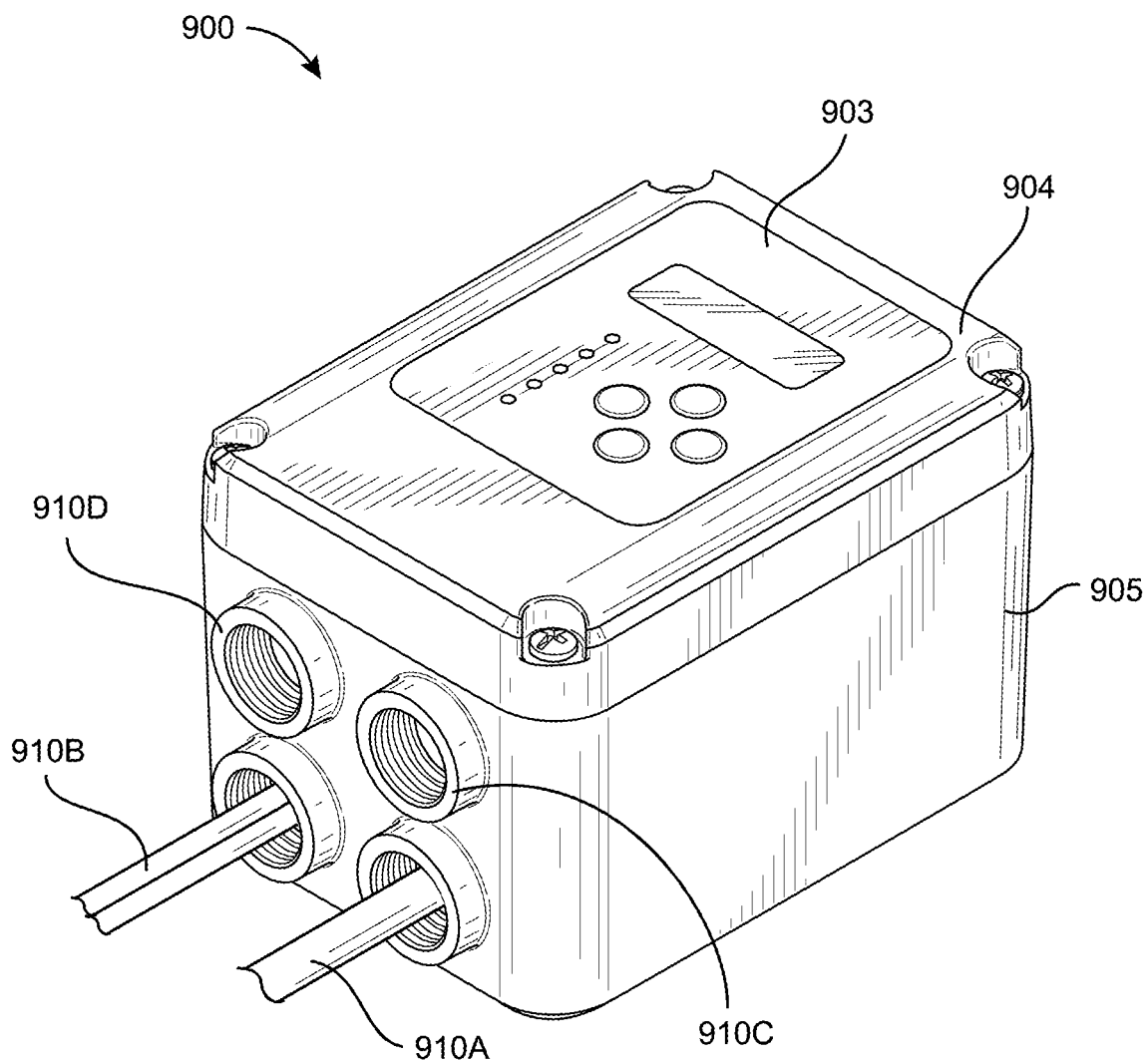
FIG. 9 is a perspective view of a flow meter control unit, according to some embodiments.
Figure 10:
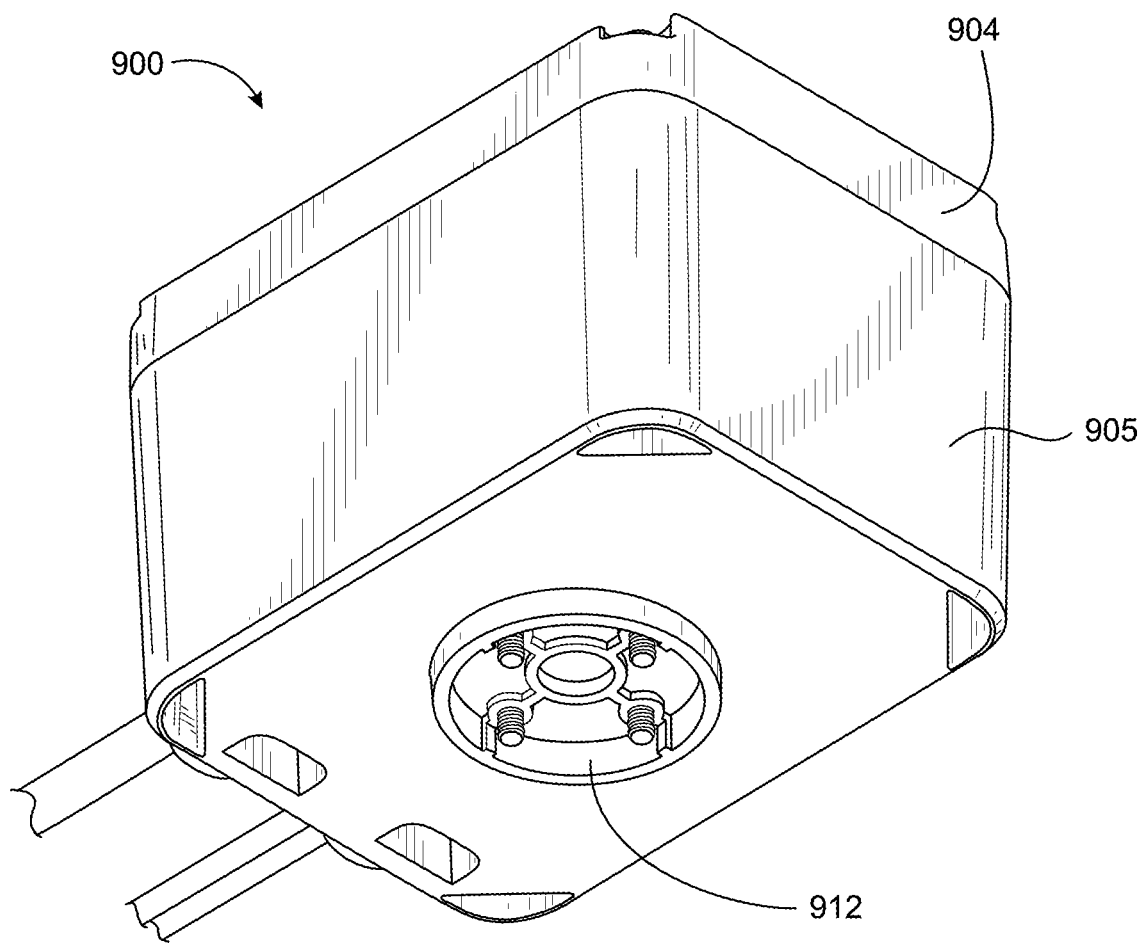
FIG. 10 is another perspective view of the flow meter control unit of FIG. 10, according to some embodiments.
Figure 14:
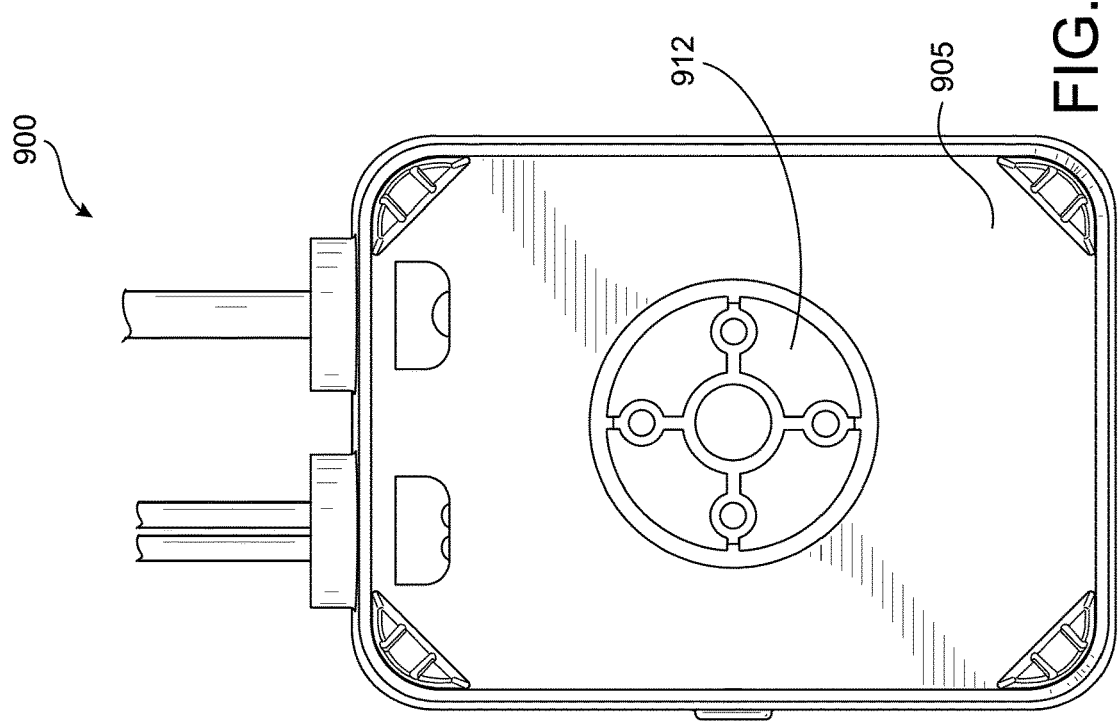
FIG. 14 is a rear elevation view of the flow meter control unit of FIG. 10, according to some embodiments.

Referring specifically to FIG. 10, a perspective view of the flow meter control unit 900 is depicted. The flow meter control unit 900 is shown to include a bottom port 912. In some embodiments, the bottom port 912 can be fastenably coupled to another device. For example, as shown in FIG. 9, the bottom port 912 can fastenably couple the flow meter control unit 904 and the flow sensor assembly 906. The bottom port 912 can also include a hole that can be utilized by a communication line, such that the communicate line can communicably couple the flow meter control 900 and another device. For example, an ultrasonic transducer, configured to measure the flow rate or velocity using any applicable flow sensing method, can provide a data signal to the flow meter control unit 900 via a wired network interface that utilizes the bottom port 912 to connect the two devices. In another example, a tube (e.g., pitot tube) can be fed through the bottom port 912 from an assembly (e.g., flow sensor assembly 906) to the flow meter control unit 900, such that a flow measurement can be determined. In some embodiments, and with reference to communication line 534 of FIG. 7, a communication line can be fed through the bottom port 912 that can include the tube and a wired network line. In other embodiments, other communication lines could be fed through the bottom port 912.

Referring specifically to FIGS. 11 and 12, side elevation views of the flow meter control unit 900 are depicted. In some embodiments, the flow meter control unit 900 can include a first enclosure component 904, a second enclosure component 905, and a plurality of communication ports. As shown, in one embodiment, the flow meter control unit 900 can include communication port 910A, communication port 910B, communication port 910C, and communication port 910D. Each communicate port can be utilized by a communication line (e.g., communication line 910) such that the flow meter control unit 900 can receive input and provide output to other components or systems. For example, communication port 910A can include or be coupled to a communication line communicably coupling the flow meter control unit 900 and actuator 902. In another example, communication port 910B can include a communication line communicably coupled to an external monitor such that the monitor can display statistical data associated with a flow sensor assembly (e.g., flow sensor assembly 700). In yet another example, communication port 910C can be utilized as a universal plug and play (UPnP) port for devices (e.g., printers, mobile devices, network devices) to connect to the flow meter control unit 900, such that the devices could aid in reporting or configuring of a given product (e.g., the flow sensor assembly 700).

Figure 15:
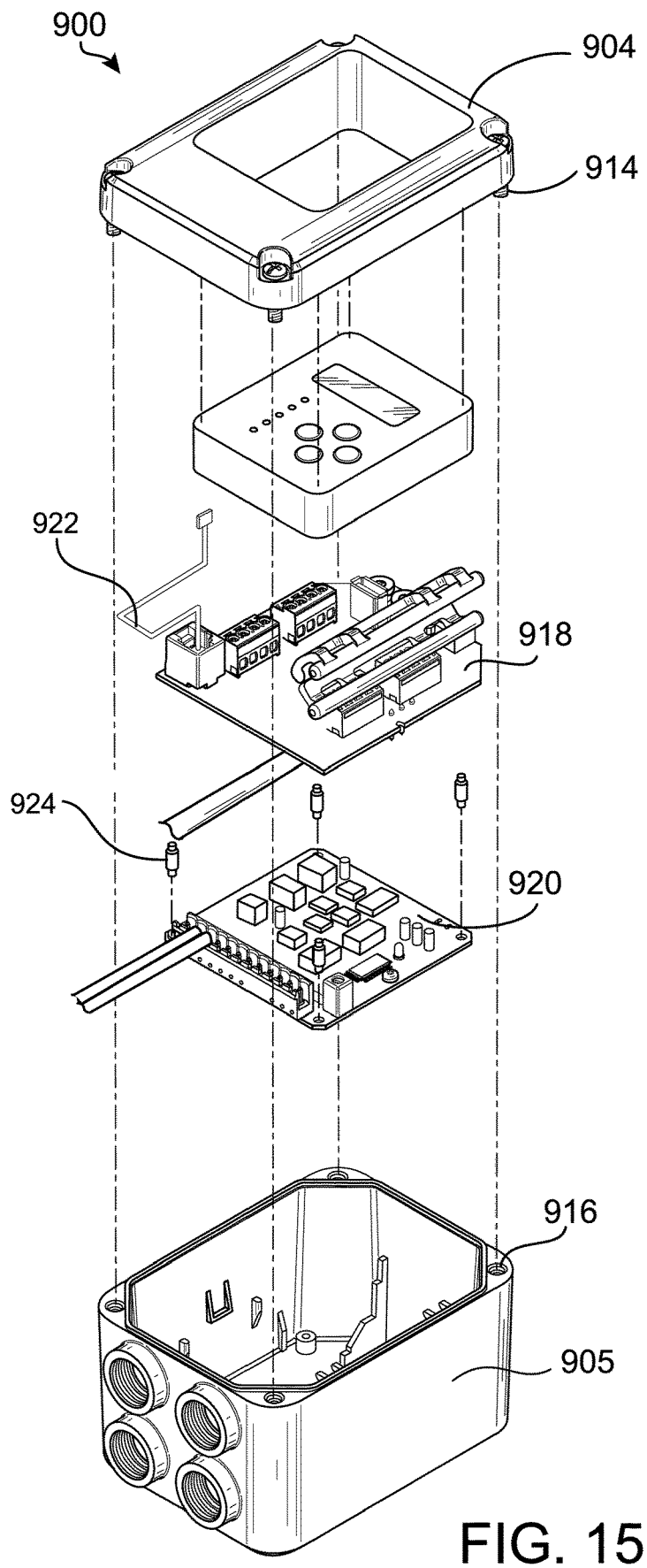
FIG. 15 is an exploded view of the flow meter control unit of FIG. 10, according to some embodiments.

Turning now to FIG. 15, an exploded view of the flow meter control unit 900 is depicted. The flow meter control unit 900 resemble similar features and functionality, described in detail with reference to FIG. 7. As shown, flow meter control unit 900 includes a first enclosure component 904, a user interface component 903, a low voltage component board 918 coupled to the user interface component 903 via wire routing 922, and a high voltage component board 920 coupled to the low voltage component board 108 via multiple standoffs 924. Flow meter control unit 900 is further shown to include a second enclosure component 905 that may be detachably coupled to the first enclosure component 904. As shown, in one embodiment, the first enclosure component 904 and the second enclosure component 905 may be coupled using a plurality of fasteners 914 in which the fasteners 914 go through the first enclosure component 904 to fit in fastener holes 916 (e.g., threaded hole) of the second enclosure component 905. In other embodiments, the enclosure components 904 and 905 may be coupled using any suitable mechanism (e.g., hinges, snag-fit).

Figure 16:
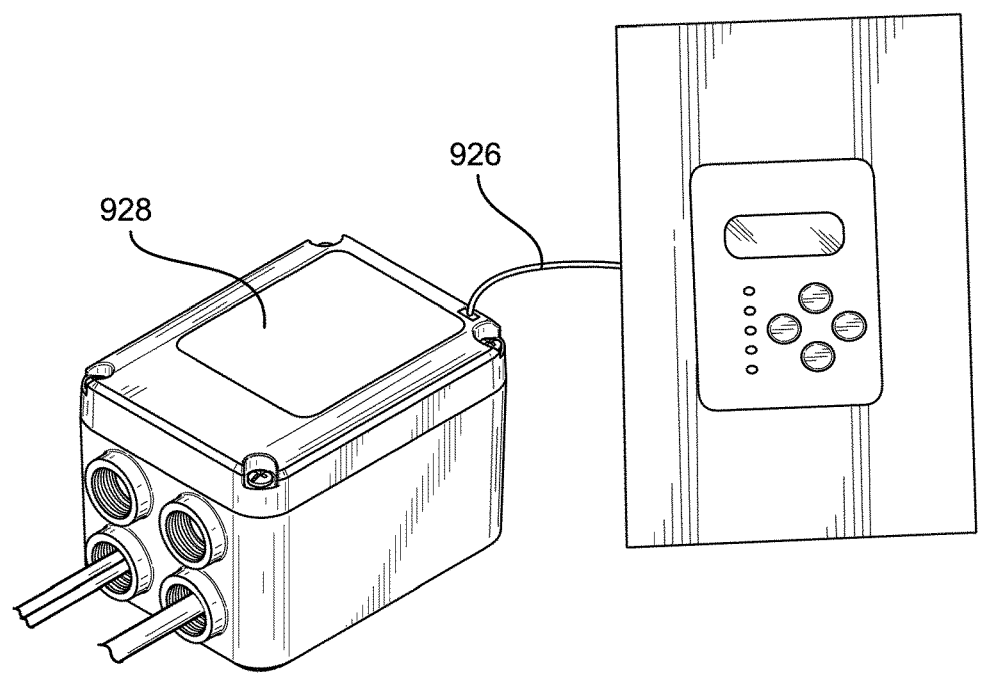
FIG. 16 is a perspective view of the remote mounting feature of the flow meter control unit of FIG. 9, according to some embodiments.
Figure 17:
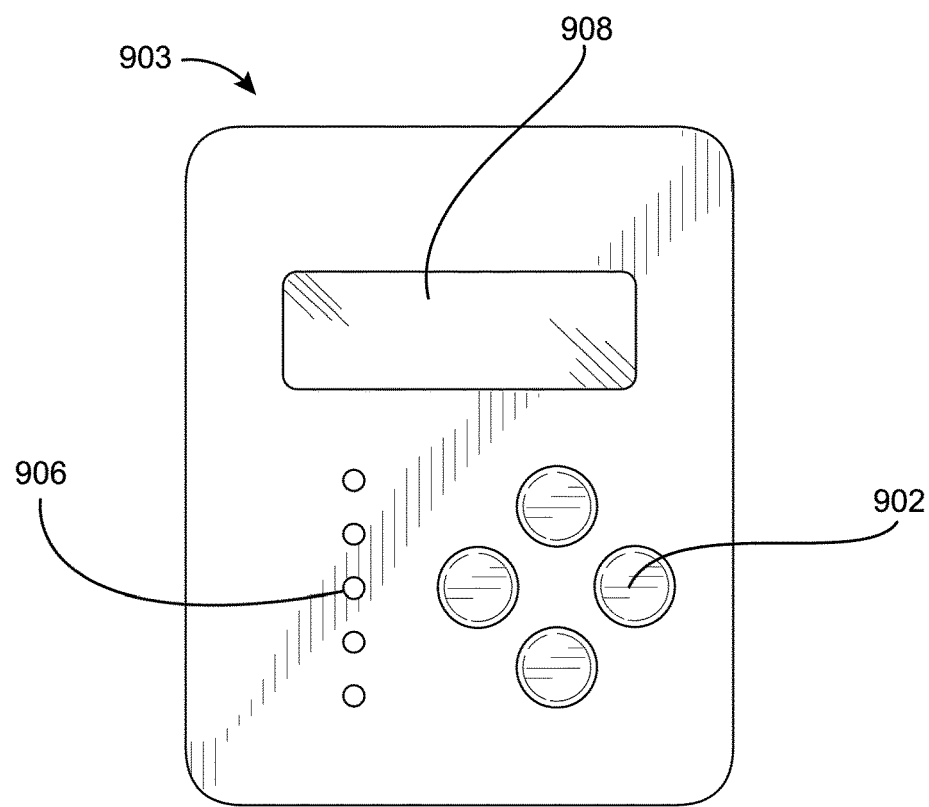
FIG. 17 is a front elevation view of the user interface component of the flow meter control unit of FIG. 9, according to some embodiments.

FIGS. 16-17 depict the remote mounting usage capabilities of the flow meter control unit 900. As shown, the user interface component 903 may be removed from the flow meter control unit 900 and mounted in a different location from the remainder of the flow meter control unit 900. For example, in some embodiments, the installation location for the flow meter control unit 900 may require both user accessibility and the ability to wash the installation location with water and/or cleaning fluid (e.g., waterside system 200). Since the user interface component 903 may be better protected against environmental conditions than the rest of the flow meter control unit 900 (e.g., the user interface component 903 may have an IP54 ingress protection rating, or the user interface component 903 may have an IP68 ingress protection rating), the user interface component 903 may be mounted separately and connected to the flow meter control unit 900 using an accessory cable 926. In some embodiments, the length of the accessory cable 926 permits the user interface component 903 to be mounted up to 10 feet or more away from the flow meter control unit 900. For example, in some embodiments, the accessory cable 926 can have a length ranging from 2 feet to 15 feet. In some embodiments, when the user interface component 903 is mounted remotely, the opening for the user interface component 903 in the first enclosure component 904 may be covered by a cover plate accessory 928. In another embodiments, the user interface component 903 can be communicably coupled to the flow meter control unit 900 via a wireless communications network, such that the user interface component 903 can modify configuration parameters associated with the flow sensor assembly 700 (e.g., actuator 502).

Figure 13:
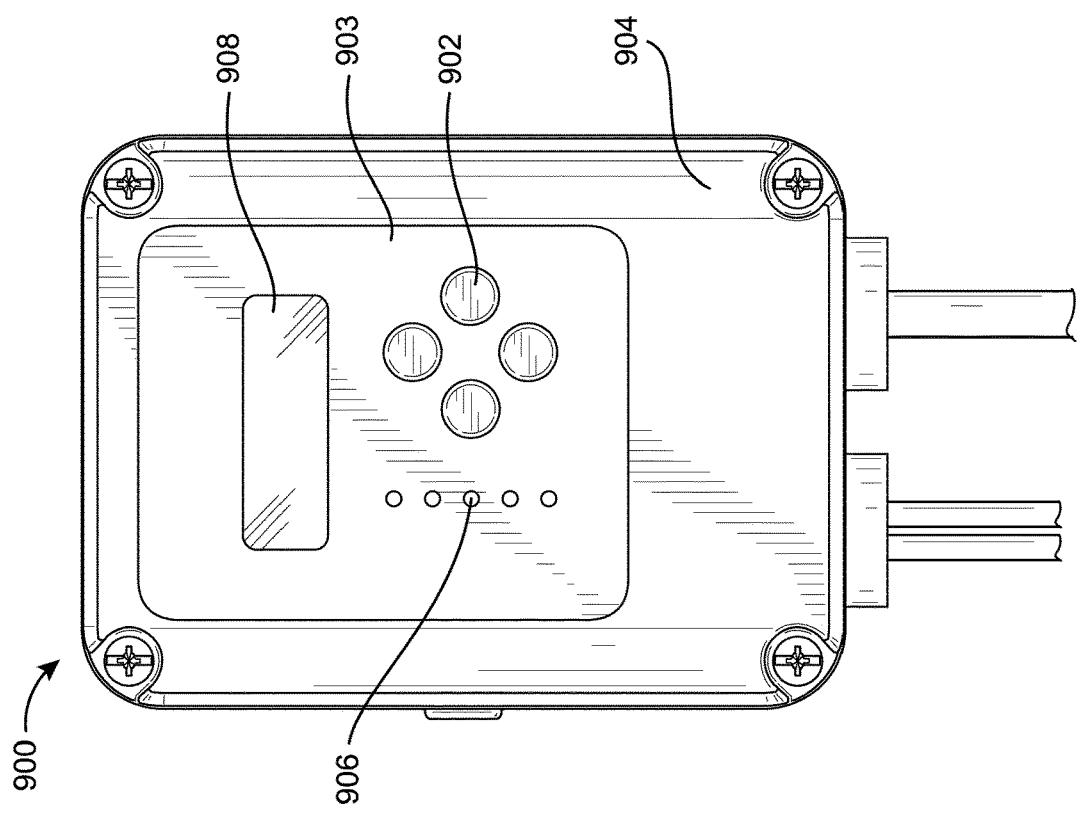
FIG. 13 is a front elevation view of the flow meter control unit of FIG. 10, according to some embodiments.

In some implementations, the user interface component 903 can include a dedicated processing circuit. The dedicated processing circuit may store and execute an application to configure parameters of the flow sensor assembly 700. For example, the processing circuit executing the application could receive inputs (e.g., button inputs) via a user such that the received unit controls modify configuration parameters associated with the actuator 502. Further, the modified configuration parameters could optimize and maintain the flow and/or temperature change across a heat transfer coil based on a determination by the user and/or an indication by the user interface component 903. The features and functionality of the user interface component 903 can provide all the hardware and software to configure and make adjustments to the configuration parameters associated with a given system (e.g., the flow sensor assembly 700). These features and functionality can enable the user to not have to utilize external accessories to commission a product once installed. Further, the user interface component 903 can provide real-time feedback to the user via the display (e.g., display 1008, as shown in FIG. 13), such that it can be configured to continuously display desired information (e.g., instantaneous flow rate or energy performance).

In another example, the processing circuit executing the application could receive inputs (e.g., button inputs) via a user such that the received unit controls modify diagnostic parameters (i.e., a subset of configuration parameters) associated with the actuator 502. For example, the diagnostic parameters could include, but is not limited to, flow diagnostic parameters (e.g., moving averages of actual flow and the current flow setpoint, Boolean logic (true or false) when an actuator 502 cannot maintain the flow setpoint, and/or moving average of error between actual differential and current differential error), temperature diagnostic parameters (e.g., moving averages of current temperature and the temperature setpoint, Boolean logic (true or false) when an actuator 502 cannot maintain the temperature, and/or heat maximum/minimum is reached), fault diagnostic parameters (e.g., alarms, notification process), and/or network diagnostic parameters (e.g., network connectivity, wireless network). Further, the modified diagnostic parameters could optimize and maintain the flow and/or temperature change across a heat transfer coil based on a determination by the user and/or an indication by the user interface component 903.

Figure 18:
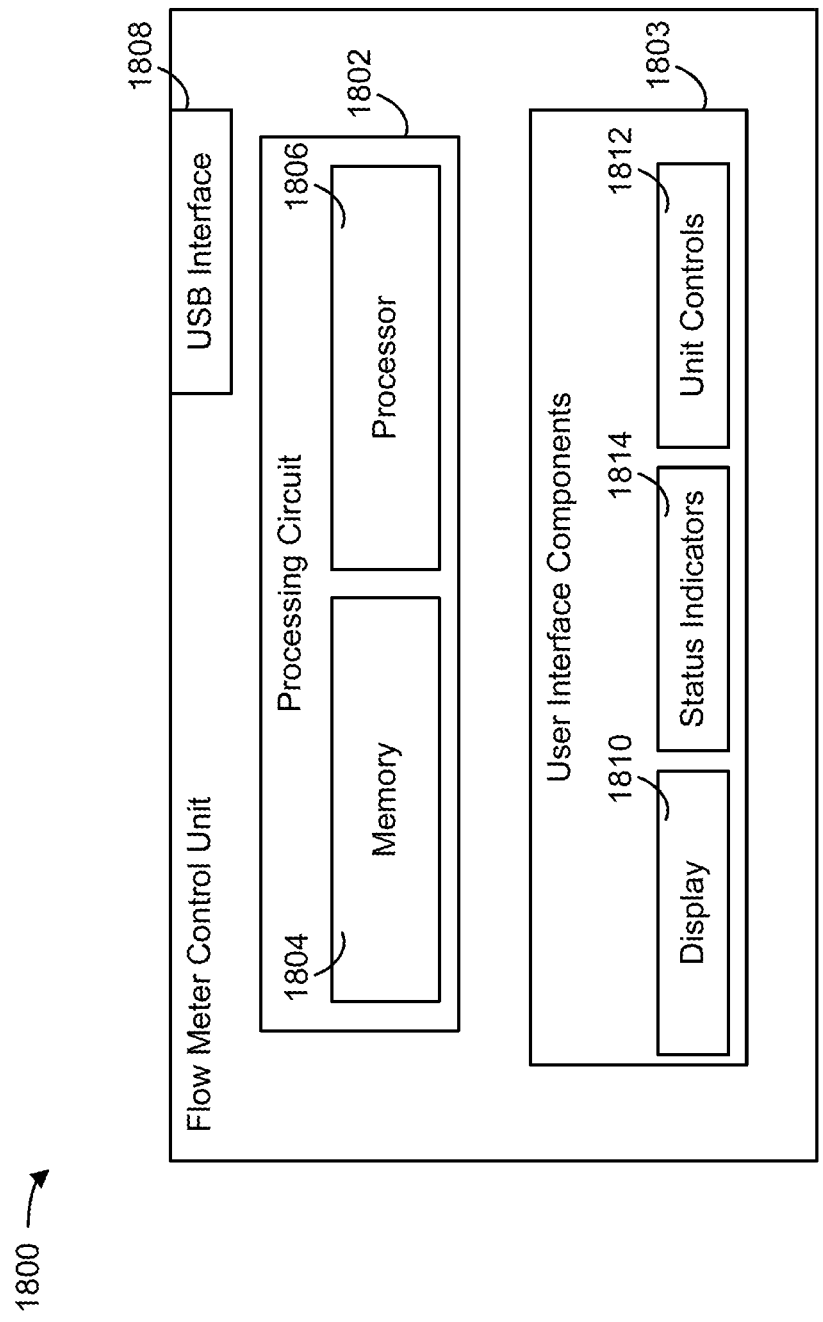
FIG. 18 is a block diagram of a flow meter control unit, according to some embodiments.

Referring now to FIG. 18, the user interface component 903 is shown according to one embodiment. User interface component 903 is shown to include a display 908. The display 908 could be a plurality of output devices utilized for presentation of information in a visual or tactile form (e.g., segment display, plasma display (PDP), liquid crystal display (LCD), light-emitting diode display (LED), quantum dot display (QLED)). For example, the display may include a seven-segment alphanumeric dot matrix display component combined with a standard 3-digit segmented LCD component. In this example, the seven-segment dot matrix display component may be configured to permit plain language information (e.g., flow measurement, temperature) to scroll across the display in a variety of languages. In another example, the display may include an LED display component configured to permit the display of statistical data (e.g., flow sensor assembly data) utilizing a plurality of pixels on the LED display component.

In some embodiments, the display 908 can be configured to include several touch screen components (e.g., capacitive, resistive, or surface acoustical wave), such that the user can provide input through touch gestures on display 908. The touch screen components may include an overlay that may be pasted on the front surface of the user interface components 903 to meet IP68 water ingress standards. In one example, the display 908 may be configured to allow a user to interface with the flow sensor assembly 700. In various embodiments, the touch screen components may include, among other controls, a MENU/ESC control, a down arrow control, an up arrow control, and a SET control. The MENU/ESC control may be configured to allow a user to navigate through a menu structure of an application. In some embodiments, the MENU/ESC control button is configured to operate with a long press feature that requires a user to depress the button for a slightly longer than average time in order to avoid the accidental operation of the button. Spacing between the touch screen controls may also be configured to prevent accidental button operation. The touch screen controls can further include an alarm button. The alarm button may include a multicolor lighting feature that indicates the criticality of the alarm. For example, the alarm button may be illuminated red for a more critical alarm, and yellow for a less critical alarm.

In addition to the display 908, user interface component 903 may include a plurality of unit controls 902 configured in a plurality of arrangements and configured to receive input from a user via an input device (e.g., knob, joystick, button, switch). As shown, in one embodiment, the user interface component 903 may contain 4 buttons. Each button can be programmed by an application, such that when the buttons are pressed, one or more processors can execute a plurality of different tasks. For example, two of the buttons may be configured to navigate an application displayed on display 908. In the same example, one of the buttons may be configured to allow selection of items on the application displayed on display 908 and one of the buttons may be configured as a "home button" such that when the button is pressed the application displays a configured default page on display 908. In another arrangement, the user interface component 903 may contain a potentiometer, and a 4-way joystick with a single action button. For example, the potentiometer may be configured to adjust a position of the actuator, and the 4-way joystick may be configured to navigate an application displayed on display 908, and the single action button incorporated in the 4-way joystick may be configured to allow selection of items on the application displayed on display 908.

In some embodiments, the user interface component 903 may also include a plurality of indicator lights 906 configured in a plurality of arrangements and configured to provide the status information associated with a system (e.g., flow sensor assembly 700). The indicator lights 906 could be a plurality of light-emitting diodes (LEDs) such that the LEDs can indicate one or more statuses of flow sensor assembly 700. The LEDs can be capable of illuminating a wide variety of colors and patterns, each of which can indicate system status information. For example, if a fault occurs in the flow sensor assembly 700, one or more processing circuit (e.g., flow meter processing circuit 520) can send data to one or more of the LEDs such that they indicate a fault occurred (i.e., by blinking red). In another example, one of the indicator lights 906 may be configured to indicate the real-time power information. In this example, the indicator light may be illuminated green when the system is receiving sufficient power, the indicator light may be illuminated red when the system is receiving no power, and the indicator light may be illuminated yellow when the system is not receiving adequate power. In another example, one or more of indicator lights 906 may provide network connectivity information. In this example, if a system (e.g., flow sensor assembly 700) is connected to a network (e.g., WiFi) an indicator light may be illuminated green, but if the system loses connection to the network the indicator light may be illuminated and/or blinking red.

In some embodiments, one or more features and functionalities of the user interface component 903 may operate at certain times on a secondary power source (e.g., battery backup). For example, the secondary battery source may provide power to the user interface component 903 if power is lost to the system. This could be advantageous in numerous scenarios, for example in one scenario, if power is lost to the system the user interface component 903 can still provide a user with important information. Further, the features and functionality of the user interface component 903 can provide all the hardware and software to configure and make adjustments to the configuration parameters associated with a given system (e.g., the flow sensor assembly 700).

Referring now to FIG. 18, a block diagram of a flow meter control unit 1800 is depicted, according to some embodiments. In various embodiments, flow meter control unit 1800 is identical or substantially similar to the flow meter control units described above. Flow meter control unit 1800 is shown to include a processing circuit 1802. Processing circuit 1802 can be communicably connected to USB interface 1808 and user interface components 1803 such that processing circuit 1802 and the various components thereof can send and receive data via the user interface components 1803 and USB interface 1808.

Processing circuit 1802 may include memory 1804 and a processor 1806. Processor 1806 can be implemented as a general-purpose processor, an application specific integrated circuit (ASIC), one or more field programmable gate arrays (FPGAs), a group of processing components, or other suitable electronic processing components. Memory 1804 (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present application. Memory 1804 can be or include volatile memory or non-volatile memory. Memory 1804 may include database components, object code components, script components, or any other type of information structure for supporting the various activities and information structures described in the present application. According to some embodiments, memory 1804 is communicably connected to processor 1806 via processing circuit 1802 and includes computer code for executing (e.g., by processing circuit 1802 and/or processor 1806) one or more processes described herein. In various embodiments, the processing circuit may be communicably coupled to various components of the valve assembly (not shown) and control signals transmitted to the valve assembly from the processing circuit 1802 may modify an operating condition of the valve assembly.

Flow meter control unit 1800 is further shown to include a USB interface 1808, a user interface that includes a display 1810, unit controls 1812, and status indicators 1814. USB interface 1808 may be communicably coupled to a USB port (e.g., USB port) accessible from the exterior of the flow meter control unit 1800. In some embodiments, USB interface 1808 may be used to update control unit firmware. For example, as updates to the system become available, a user may obtain the updated firmware and upload it to flow meter control unit 1800 via USB interface 1808.

Display 1810 may be communicably coupled to a display (e.g., display 908, as shown in FIG. 13), while unit controls 1812 may be communicably coupled to inputs (e.g., input buttons). Based on data received from the inputs via the unit controls 1812, the processing circuit 1802 may execute processes and output data (e.g., an actuator position) that are displayed on the display 1810.

Flow meter control unit 1800 is further shown to include status indicators 1814. Status indicators 1814 may be configured to indicate one or more statuses of flow sensory assembly 700. That is, the processing circuit 1802 could receive input data associated with an operating condition of the flow sensory assembly 700. In some embodiments, the processing circuit 1802 may be configured to determine one or more statuses of flow sensory assembly 700 and indicate the statuses on the status indicators 1814. In some embodiments, the status indicators 1814 could include a plurality of light-emitting diodes (LEDs) such that the LEDs can indicate the statuses of flow sensor assembly 700. The LEDs can be capable of illuminating a wide variety of colors and patterns, each of which can indicate system status information, and described in detail with reference to status indicators 518 of FIG. 7. In some embodiments, the colors (e.g., green, yellow, red) can indicate the status of the flow sensor assembly 700. In various embodiments, the patterns (e.g., blinking, solid, dimmed) can also indicate the status of the flow sensor assembly 700.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied, and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general-purpose computer, special purpose computer, or special purpose processing machines to perform a certain function or group of functions.

Although the figures show a specific order of method steps, the order of the steps may differ from what is depicted. Also, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps.

What is claimed is:

1. A flow meter control assembly, comprising:
    a housing;
    a user interface disposed in the housing, the user interface comprising:
        an input device configured to receive a configuration parameter from a user;
        a display configured to display the configuration parameter;
    a processing circuit disposed within the housing and coupled to the user interface, the processing circuit configured to:
        update a control program of at least one of the flow meter control assembly and an actuator coupled to the flow meter control assembly based on the configuration parameter, wherein the configuration parameter is a diagnostic parameter comprising a moving average of actual flow, a moving average of error between actual differential and current differential error, or a moving averages of current temperature and a temperature setpoint;
    wherein the flow meter control assembly is mounted to a flow sensor assembly;
    wherein the flow sensor assembly is configured to measure a flow rate or a velocity of fluid passing through a conduit;
    wherein the actuator is configured to operate a control valve assembly and communicably coupled to the processing circuit; and
    the control valve assembly coupled to the actuator and configured to control a flow of fluid through the conduit, wherein the flow sensor assembly is upstream of the control valve assembly.

2. The flow meter control assembly of claim 1, wherein the configuration parameter comprises a configuration parameter for the flow meter control assembly, and wherein the processing circuit comprises a plurality of component boards comprising at least a low voltage component board and a high voltage component board.

3. The flow meter control assembly of claim 1, wherein the input device comprises a plurality of input buttons and a touchscreen.

4. The flow meter control assembly of claim 1, the housing comprises a plurality of enclosure components comprising:
    a first enclosure component; and
    a second enclosure component detachably coupled to the first enclosure component, wherein the second enclosure component comprises a bottom port fastenably coupling the flow meter control assembly to the flow sensor assembly, a user interface component is disposed in the second enclosure component of the housing.

5. The flow meter control assembly of claim 1, wherein a user interface component is configured to be detachably coupled to the housing such that the user interface component is operational both when mounted in the housing and when detached from the housing.

6. The flow meter control assembly of claim 1, wherein a user interface component further comprises a plurality of status indicators configured to illuminate at least one of a plurality of colors and a plurality of light patterns to indicate a status of the actuator, wherein the user interface component is detachably coupled to the housing.

7. The flow meter control assembly of claim 1, wherein the processing circuit is configured to receive data from the flow sensor assembly and display at least one of the flow rate and an energy performance.

8. A flow sensor assembly comprising:
a flow sensor;
a flow meter mounted to the flow sensor and comprising:
a housing;
a user interface detachably coupled to the housing and configured to receive a plurality of parameter values for a plurality of flow assembly operating parameters; and
a processing circuit disposed in the housing and communicably coupled to the user interface and the flow sensor, the processing circuit configured to:
receive sensor data from the flow sensor;
receive a user input from the user interface; and
modify an operating condition of a flow assembly based at least in part on the user input;
update a control program of at least one of a flow meter control assembly and an actuator coupled to the flow meter control assembly based on a diagnostic parameter comprising a moving average of actual flow, a moving average of error between actual differential and current differential error, or a moving averages of current temperature and a temperature setpoint;
wherein the flow sensor assembly is upstream of the actuator.

9. The flow sensor assembly of claim 8, wherein a user interface component comprises a plurality of input buttons and a touchscreen, and wherein the processing circuit comprises a plurality of component boards comprising at least a low voltage component board and a high voltage component board.

10. The flow sensor assembly of claim 8, further comprising:
the flow sensor configured to measure a flow rate or a velocity of fluid passing through a conduit;
the actuator configured to operate a control valve and communicably coupled to the flow meter; and
the control valve coupled to the actuator and configured to control a flow of fluid through the conduit, wherein the flow sensor is upstream of the control valve.

11. The flow sensor assembly of claim 8, wherein the user interface is configured to be detachably coupled to the housing such that the user interface is operational both when mounted in the housing and when detached from the housing.

12. The flow sensor assembly of claim 8, wherein the user interface further comprises a plurality of status indicators configured to illuminate at least one of a plurality of colors and a plurality of light patterns to indicate a status of the actuator.

13. The flow sensor assembly of claim 8, wherein the processing circuit is configured to display at least one of a flow rate and an energy performance based on the received sensor data.

14. The flow sensor assembly of claim 8, wherein the processing circuit is further configured to:
receive flow sensor data from the flow sensor; and
display at least one of an instantaneous flow rate and an energy performance based on the flow sensor data.

15. The flow sensor assembly of claim 8, wherein the processing circuit is further configured to update the control program of the flow assembly based at least in part on the plurality of flow assembly operating parameters.

16. The flow meter control assembly of claim 1, wherein the diagnostic parameter is used to optimize and maintain flow and/or temperature change across a heat transfer coil.

17. The flow meter control assembly of claim 1, wherein the diagnostic parameter comprises a network diagnostic parameter.

18. The flow meter control assembly of claim 8, wherein the diagnostic parameter comprises a network diagnostic parameter.

19. The flow meter control assembly of claim 8, wherein the diagnostic parameter is used to optimize and maintain flow and/or temperature change across a heat transfer coil.

20. A flow meter control assembly, comprising:
a housing;
a user interface disposed in the housing, the user interface comprising:
an input device configured to receive a configuration parameter from a user;
a display configured to display the configuration parameter;
an actuator;
a control valve assembly;
a processor disposed within the housing and coupled to the user interface, the processor configured to:
update a control program of at least one of the flow meter control assembly and the actuator coupled to the flow meter control assembly based on the configuration parameter, wherein the configuration parameter is a diagnostic parameter comprising a moving average of actual flow, a moving average of error between actual differential and current differential error, or a moving averages of current temperature and a temperature setpoint, wherein the control valve assembly is configured to control a flow of fluid through a conduit; and
a flow sensor assembly mounted to the flow meter control assembly, the flow sensor assembly being configured to measure a flow rate or a velocity of fluid passing through the conduit;
wherein the actuator is configured to operate the control valve assembly and coupled to the processor; and
wherein the control valve assembly is coupled to the actuator and configured to control the flow of fluid through the conduit, wherein the flow sensor assembly is upstream of the control valve assembly.

* * * * *